United States Patent
Zhou et al.

(10) Patent No.: US 11,843,502 B2
(45) Date of Patent: Dec. 12, 2023

(54) CONFIGURATION OF PHYSICAL UPLINK CONTROL CHANNEL (PUCCH)-BEAM FAILURE RECOVERY (BFR) FOR TRANSMISSION RECEPTION POINT (TRP) SPECIFIC BFR

(71) Applicant: QUALCOMM Incorporated, San Diego, CA (US)

(72) Inventors: Yan Zhou, San Diego, CA (US); Kiran Venugopal, Raritan, NJ (US); Mostafa Khoshnevisan, San Diego, CA (US); Tao Luo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/448,681

(22) Filed: Sep. 23, 2021

(65) Prior Publication Data
US 2022/0103419 A1 Mar. 31, 2022

Related U.S. Application Data

(60) Provisional application No. 63/083,857, filed on Sep. 25, 2020.

(51) Int. Cl.
*H04L 41/0654* (2022.01)
*H04W 72/10* (2009.01)
*H04W 72/21* (2023.01)
*H04W 72/23* (2023.01)

(52) U.S. Cl.
CPC ......... *H04L 41/0654* (2013.01); *H04W 72/21* (2023.01); *H04W 72/23* (2023.01)

(58) Field of Classification Search
CPC .... H04L 41/0654; H04W 72/21; H04W 2/23; H04W 72/23
See application file for complete search history.

(56) References Cited

U.S. PATENT DOCUMENTS

2022/0085862 A1\* 3/2022 Kung .................... H04L 1/1819

\* cited by examiner

*Primary Examiner* — Ronald B Abelson
(74) *Attorney, Agent, or Firm* — Patterson + Sheridan, L.L.P.

(57) ABSTRACT

Certain aspects provide enhancements to enable per transmission reception point (per-TRP) based beam failure recovery (BFR), and more particularly, techniques for configuring physical uplink control channel (PUCCH) BFR for TRP specific BFR. A method that may be performed by a user equipment (UE) includes communicating with at least two TRPs using beams associated with at least two beam groups, each of the beams groups associated with one of the TRPs, detecting a beam failure in a beam group of the at least two beam groups, transmitting a beam group specific BFR scheduling request (SR), in accordance with one or more rules, for an uplink (UL) grant to transmit a beam failure recovery request (BFRQ) specific to the beam group in which the beam failure was detected, receiving the UL grant in response to the SR, and transmitting the BFRQ specific to the beam group based on the UL grant.

30 Claims, 13 Drawing Sheets

CONFIGURATION OF PHYSICAL UPLINK CONTROL CHANNEL (PUCCH)-BEAM FAILURE RECOVERY (BFR) FOR TRANSMISSION RECEPTION POINT (TRP) SPECIFIC BFR

CROSS-REFERENCE TO RELATED APPLICATION

This application claims benefit of and priority to U.S. Provisional Application No. 63/083,857 filed Sep. 25, 2020, which is hereby assigned to the assignee hereof and hereby expressly incorporated by reference herein in its entirety as if fully set forth below and for all applicable purposes.

BACKGROUND

Aspects of the present disclosure relate to wireless communications, and more particularly, to enhancements for enabling per-transmission reception point (per-TRP) based beam failure recovery (BFR).

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. These improvements should be applicable to other multi-access technologies and the telecommunication standards that employ these technologies.

SUMMARY

Certain aspects of the subject matter described in this disclosure can be implemented in a method for wireless communication by a user equipment (UE). The method generally includes communicating with at least two transmission reception points (TRPs) using beams associated with at least two beam groups, each of the at least two beam groups associated with one of the at least two TRPs, detecting a beam failure in a beam group of the at least two beam groups, transmitting a beam group specific beam failure recovery (BFR) scheduling request (SR), in accordance with one or more rules, for an uplink (UL) grant to send a beam failure recovery request (BFRQ) specific to the beam group in which the beam failure was detected, receiving the UL grant in response to the SR, and transmitting the BFRQ specific to the beam group based on the UL grant.

Certain aspects of the subject matter described in this disclosure can be implemented in a method for wireless communication by a network entity. The method generally includes receiving, from a UE, a beam group specific BFR SR, in accordance with one or more rules, for a UL grant to transmit a BFRQ specific to a beam group in which a beam failure is detected, transmitting the UL grant in response to the SR, and receiving, from the UE, the BFRQ specific to the beam group in which the beam failure was detected, based on the UL grant.

Certain aspects of the subject matter described in this disclosure can be implemented in an apparatus for wireless communication by a UE. The apparatus may include a memory and one or more processors coupled to the memory, the memory and the one or more processors being configured to: communicate with at least two TRPs using beams associated with at least two beam groups, each of the at least two beam groups associated with one of the at least two TRPs, detect a beam failure in a beam group of the at least two beam groups, transmit a beam group specific BFR SR, in accordance with one or more rules, for a UL grant to send a BFRQ specific to the beam group in which the beam failure was detected, receive the UL grant in response to the SR, and transmit the BFRQ specific to the beam group based on the UL grant.

Certain aspects of the subject matter described in this disclosure can be implemented in an apparatus for wireless communication by a network entity. The apparatus may include a memory and one or more processors coupled to the memory, the memory and the one or more processors being configured to: receive, from a UE, a beam group specific BFR SR, in accordance with one or more rules, for a UL grant to transmit a BFRQ specific to a beam group in which a beam failure is detected, transmit the UL grant in response to the SR, and receive, from the UE, the BFRQ specific to the beam group in which the beam failure was detected, based on the UL grant.

Certain aspects of the subject matter described in this disclosure can be implemented in an apparatus for wireless communication by a UE. The apparatus may include means for communicating with at least two TRPs using beams associated with at least two beam groups, each of the at least two beam groups associated with one of the at least two TRPs, means for detecting a beam failure in a beam group of the at least two beam groups, means for transmitting a beam group specific BFR SR, in accordance with one or more rules, for a UL grant to send a BFRQ specific to the beam group in which the beam failure was detected, means for receiving the UL grant in response to the SR, and means for transmitting the BFRQ specific to the beam group based on the UL grant.

Certain aspects of the subject matter described in this disclosure can be implemented in an apparatus for wireless communication by a network entity. The apparatus may include means for receiving, from a UE, a beam group specific BFR SR, in accordance with one or more rules, for a UL grant to transmit a BFRQ specific to a beam group in which a beam failure is detected, means for transmitting the UL grant in response to the SR, and means for receiving, from the UE, the BFRQ specific to the beam group in which the beam failure was detected, based on the UL grant.

Certain aspects of the subject matter described in this disclosure can be implemented in a non-transitory computer-readable medium for wireless communication by a UE. The non-transitory computer-readable medium may comprise computer-executable instructions that, when executed by one or more processors of a processing system, cause the processing system to: communicate with at least two TRPs using beams associated with at least two beam groups, each of the at least two beam groups associated with one of the at least two TRPs, detect a beam failure in a beam group of the at least two beam groups, transmit a beam group specific BFR SR, in accordance with one or more rules, for a UL grant to send a BFRQ specific to the beam group in which the beam failure was detected, receive the UL grant in response to the SR, and transmit the BFRQ specific to the beam group based on the UL grant.

Certain aspects of the subject matter described in this disclosure can be implemented in a non-transitory computer-readable medium for wireless communication by a network entity. The non-transitory computer-readable medium may comprise computer-executable instructions that, when executed by one or more processors of a processing system, cause the processing system to: receive, from a UE, a beam group specific BFR SR, in accordance with one or more rules, for a UL grant to transmit a BFRQ specific to a beam group in which a beam failure is detected, transmit the UL grant in response to the SR, and receive, from the UE, the BFRQ specific to the beam group in which the beam failure was detected, based on the UL grant.

Certain aspects of the subject matter described in this disclosure provide a computer program product embodied on a computer-readable storage medium comprising code for communicating with at least two TRPs using beams associated with at least two beam groups, each of the at least two beam groups associated with one of the at least two TRPs, code for detecting a beam failure in a beam group of the at least two beam groups, code for transmitting a beam group specific BFR SR, in accordance with one or more rules, for a UL grant to send a BFRQ specific to the beam group in which the beam failure was detected, code for receiving the UL grant in response to the SR, and code for transmitting the BFRQ specific to the beam group based on the UL grant.

Certain aspects of the subject matter described in this disclosure provide a computer program product embodied on a computer-readable storage medium comprising code for receiving, from a UE, a beam group specific BFR SR, in accordance with one or more rules, for a UL grant to transmit a BFRQ specific to a beam group in which a beam failure is detected, code for transmitting the UL grant in response to the SR, and code for receiving, from the UE, the BFRQ specific to the beam group in which the beam failure was detected, based on the UL grant.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
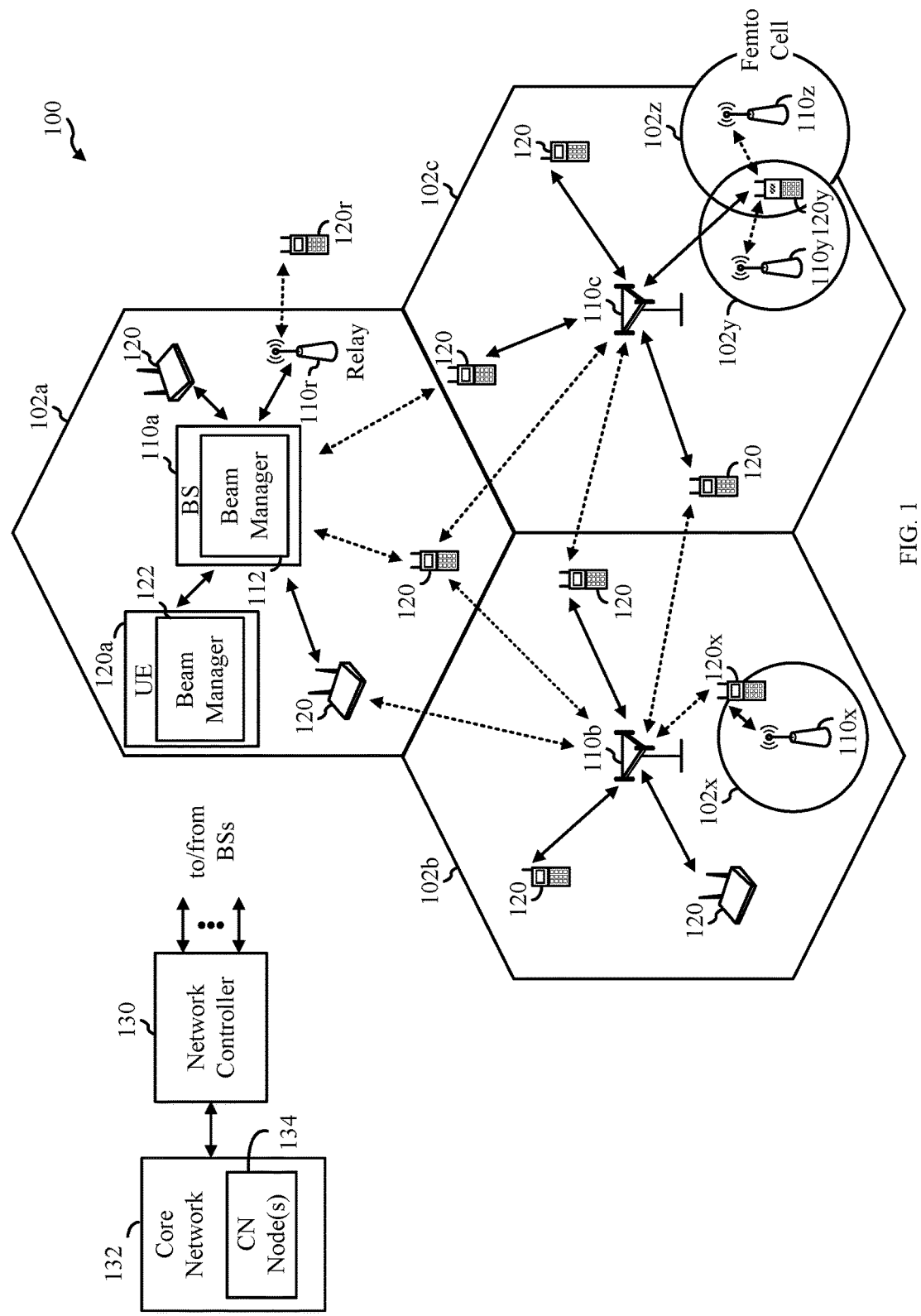
FIG. 1 is a block diagram conceptually illustrating an example wireless system, in accordance with certain aspects of the present disclosure.

Aspects of the present disclosure provide apparatus, methods, processing systems, and computer-readable mediums for techniques for enabling per-transmission reception point (per-TRP) or per beam group based beam failure recovery (BFR) procedures. In the absence of per-TRP BFR, beam failure detection (BFD) and candidate beam detection (CBD) may not be triggered until all beams in that component carrier (CC) become weak. With per-TRP BFR, when beams for a given TRP become weak, beam recovery procedures can be performed, and a best beam corresponding to that TRP can be identified without having to wait for the beams of the other TRPs to also become weak, and thus reliability and communications efficiency can be enhanced.

Accordingly, aspects of the present disclosure provide enhancements that may help enable per TRP based BFR (effectively beam group based BFR), and more particularly, techniques for the configuration of physical uplink control channel (PUCCH) BFR for TRP (or beam group) specific BFR. While the techniques may involve beam groups, they may be considered TRP-specific. This is because the concept of TRPs may generally be kept transparent to a user equipment (UE). In other words, the UE may only be aware of a beam group (for a set of beams) corresponding to a TRP (but may be unaware of the actual corresponding TRP identifier (ID)).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G new radio (NR)) wireless technologies, aspects of the present disclosure can be applied in other generation-based communication systems.

NR access may support various wireless communication services, such as enhanced mobile broadband (eMBB) targeting wide bandwidth (e.g., 80 megahertz (MHz) or beyond), millimeter wave (mmW) targeting high carrier frequency (e.g., 25 gigahertz (GHz) or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTIs) to meet respective quality of service (QoS) requirements. In addition, these services may co-exist in the same subframe. NR supports beamforming and beam direction may be dynamically configured. Multiple-input multiple-output (MIMO) transmissions with precoding may also be supported. MIMO configurations in a downlink may support up to 8 transmit antennas with multi-layer downlink transmissions up to 8 streams and up to 2 streams per UE. Multi-layer transmissions with up to 2 streams per UE may be supported. Aggregation of multiple cells may be supported with up to 8 serving cells.

Example Wireless Communications System

FIG. 1 illustrates an example wireless communication network 100 in which aspects of the present disclosure may be performed. For example, wireless communication network 100 may include a user equipment (UE), such as UE 120*a* (with a beam manager 122) that is configured to perform operations 1200 of FIG. 12. Similarly, wireless communication network 100 may include a network entity, such as base station (BS) 110*a* (with a beam manager 112) that is configured to perform operations 1300 of FIG. 13.

As shown in FIG. 1, wireless communication network 100 may be in communication with a core network 132. Core network 132 may be in communication with one or more BSs 110a-z (each also individually referred to herein as BS 110 or collectively as BSs 110) and/or UEs 120a-y (each also individually referred to herein as UE 120 or collectively as UEs 120) in wireless communication network 100 via one or more interfaces.

A BS 110 may provide communication coverage for a particular geographic area, sometimes referred to as a "cell", which may be stationary or may move according to the location of a mobile BS 110. In some examples, BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, BSs 110a, 110b, and 110c may be macro BSs for the macro cells 102a, 102b and 102c, respectively. BS 110x may be a pico BS for a pico cell 102x. BSs 110y and 110z may be femto BSs for the femto cells 102y and 102z, respectively. A BS 110 may support one or multiple cells.

BSs 110 communicate with UEs 120 in wireless communication network 100. UEs 120 (e.g., 120x, 120y, etc.) may be dispersed throughout wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, network controller 130 may be in communication with core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
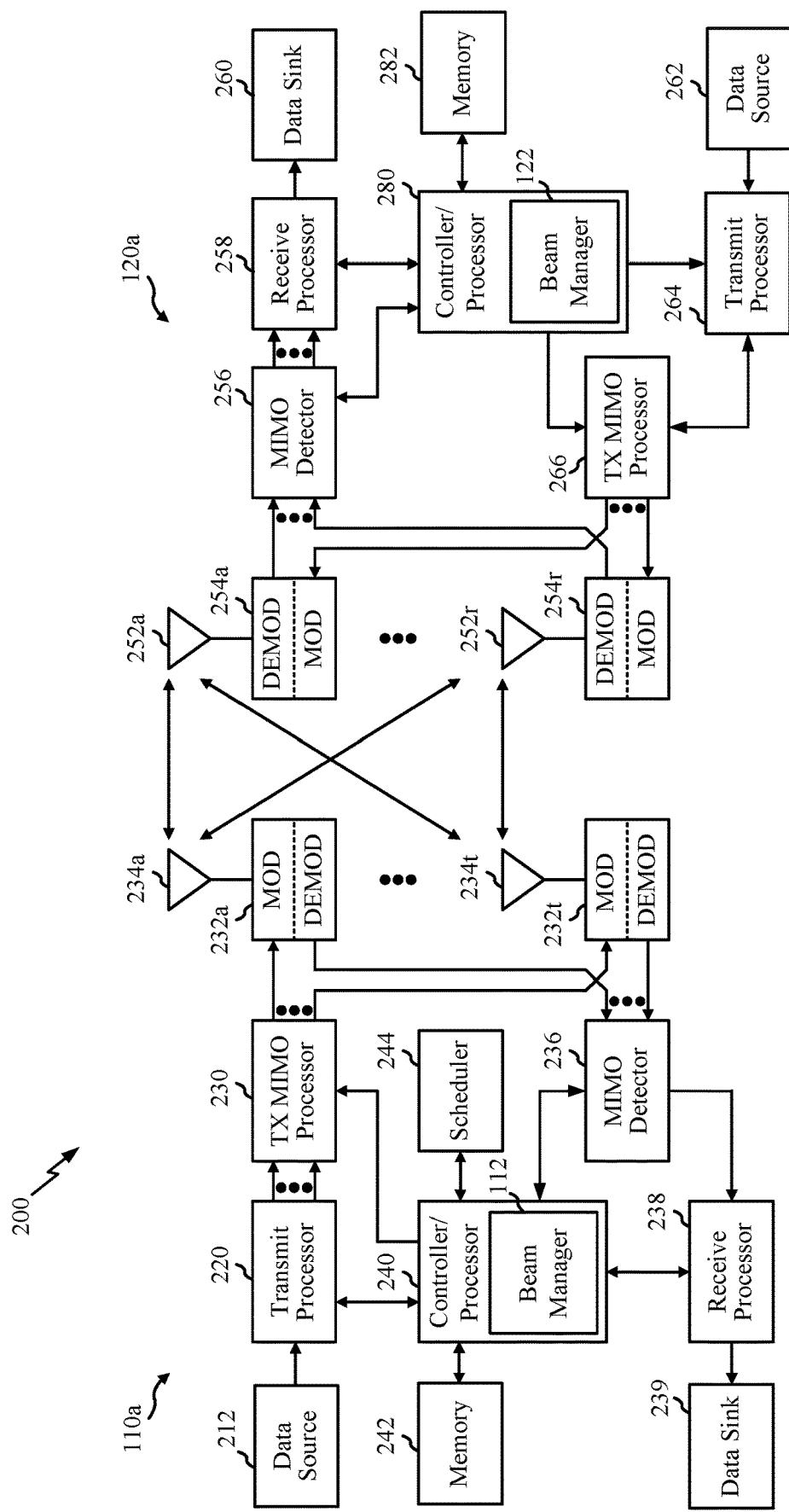
FIG. 2 illustrates example components of a network entity (e.g., base station (BS)) and a user equipment (UE), in accordance with certain aspects of the present disclosure.

FIG. 2 illustrates example components of BS 110a and UE 120a (e.g., in wireless communication network 100 of FIG. 1), which may be used to implement certain aspects of the present disclosure.

At BS 110a, a transmit processor 220 may receive data from a data source 212 and control information from a controller/processor 240. The control information may be for the physical broadcast channel (PBCH), physical control format indicator channel (PCFICH), physical hybrid automatic repeat request (HARM) indicator channel (PHICH), physical downlink control channel (PDCCH), group common PDCCH (GC PDCCH), etc. The data may be for the physical downlink shared channel (PDSCH), etc. A medium access control (MAC)-control element (CE) (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for orthogonal frequency division multiplexing (OFDM), etc.) to obtain an output sample stream. Each modulator may further process (e.g., convert to analog, amplify, filter, and upconvert) the output sample stream to obtain a downlink (DL) signal. DL signals from the modulators in transceivers 232a-232t may be transmitted via the antennas 234a-234t, respectively.

At UE 120a, antennas 252a-252r may receive the DL signals from BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for UE 120a to a data sink 260, and provide decoded control information to a controller/processor 280.

On the uplink (UL), at UE 120a, a transmit processor 264 may receive and process data (e.g., for the PUSCH) from a data source 262 and control information (e.g., for the physical uplink control channel (PUCCH) from controller/processor 280. Transmit processor 264 may also generate reference symbols for a reference signal (RS) (e.g., for the sounding reference signal (SRS)). The symbols from transmit processor 264 may be precoded by a TX MIMO processor 266 if applicable, further processed by the modulators in transceivers 254a-254r (e.g., for single-carrier frequency division multiplexing (SC-FDM), etc.), and transmitted to BS 110a. At BS 110a, the UL signals from UE 120a may be received by antennas 234, processed by demodulators in transceivers 232a-232t, detected by a MIMO detector 236 if applicable, and further processed by a receive processor 238 to obtain decoded data and control information sent by UE 120a. Receive processor 238 may provide the decoded data to a data sink 239 and the decoded control information to the controller/processor 240.

Memories 242 and 282 may store data and program codes for BS 110a and UE 120a, respectively. A scheduler 244 may schedule UEs 120 for data transmission on the DL and/or UL.

Antennas 252, processors 266, 258, 264, and/or controller/processor 280 of UE 120a and/or antennas 234, processors 220, 230, 238, and/or controller/processor 240 of BS 110a may be used to perform the various techniques and methods described herein. For example, as shown in FIG. 2, controller/processor 240 of BS 110a has a beam manager 112 that configures PUCCH-beam failure recovery (BFR) for transmission reception point (TRP) specific (or beam group specific) BFR, according to certain aspects described herein. Similarly, as shown in FIG. 2, controller/processor 280 of UE 120a has a beam manager 122 that configures PUCCH-BFR for TRP specific (or beam group specific)

BFR, according to certain aspects described herein. Although shown at the controller/processor, other components of UE 120a and BS 110a may be used to perform the operations described herein.

NR may utilize OFDM with a cyclic prefix (CP) on the UL and DL. NR may support half-duplex operation using time division duplexing (TDD). OFDM and SC-FDM partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 kilohertz (KHz) and other SCS may be defined with respect to the base SCS (e.g., 30 kHz, 60 kHz, 120 kHz, 240 kHz, etc.).

Figure 3:
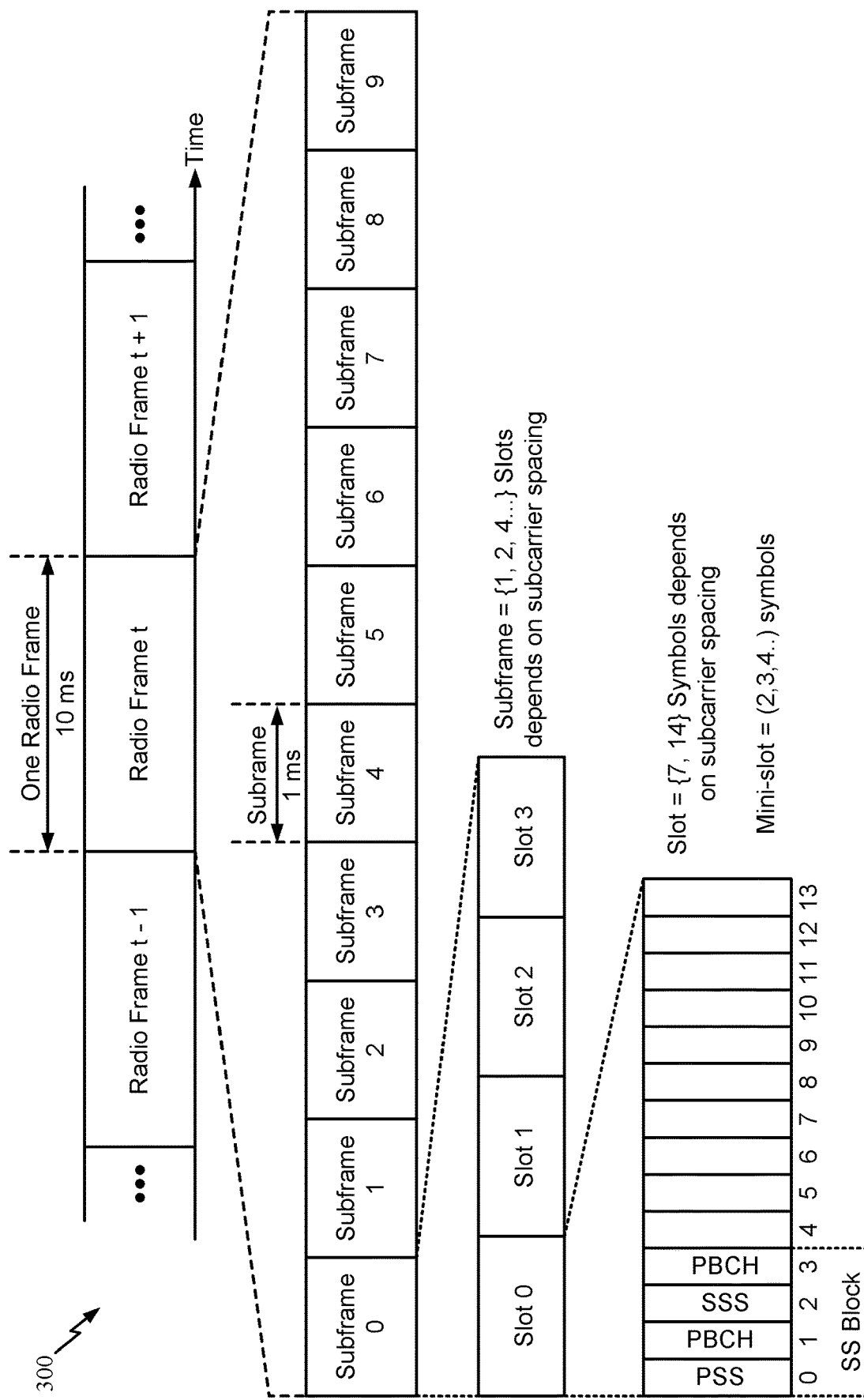
FIG. 3 is an example frame format for new radio (NR), in accordance with certain aspects of the present disclosure.

FIG. 3 is a diagram showing an example of a frame format 300 for NR, in accordance with certain aspects of the present disclosure. The transmission timeline for each of the DL and UL may be partitioned into units of radio frames. Each radio frame may have a predetermined duration (e.g., 10 milliseconds (ms)) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval (TTI) having a duration less than a slot (e.g., 2, 3, or 4 symbols). Each symbol in a slot may be configured for a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, and the SSS may provide the CP length and frame timing. The PSS and SSS may provide the cell identity. The PBCH carries some basic system information, such as DL system bandwidth, timing information within radio frame, synchronization signal (SS) burst set periodicity, system frame number, etc. The SSBs may be organized into SS bursts to support beam sweeping. Further system information such as, remaining minimum system information (RMSI), system information blocks (SIBs), other system information (OSI) can be transmitted on a PDSCH in certain subframes. The SSB can be transmitted up to sixty-four times, for example, with up to sixty-four different beam directions for millimeter wave (mmW). The multiple transmissions of the SSB are referred to as an SS burst set. SSBs in an SS burst set may be transmitted in the same frequency region, while SSBs in different SS bursts sets can be transmitted at different frequency regions.

Figure 4:
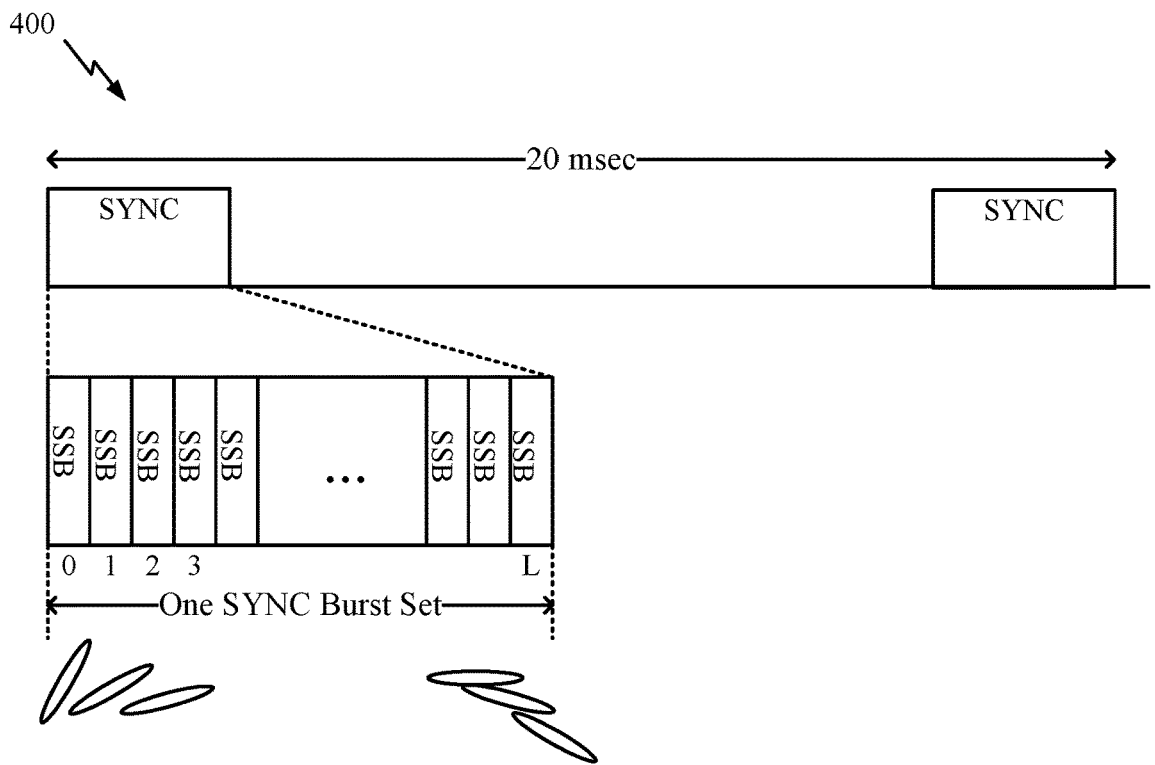
FIG. 4 illustrates how different synchronization signal blocks (SSBs) may be sent using different beams, in accordance with certain aspects of the present disclosure.

FIG. 4 illustrates how different SSBs may be sent using different beams, in accordance with certain aspects of the present disclosure. As shown in FIG. 4, the SSBs may be organized into SS burst sets to support beam sweeping. Each SSB within a burst set may be transmitted using a different beam, which may help a UE quickly acquire both transmit (TX) and receive (RX) beams (particular for mmW applications). A physical cell identity (PCI) may still be decoded from the PSS and SSS of the SSB.

Certain deployment scenarios may include one or both NR deployment options. Some may be configured for a non-standalone (NSA) and/or a standalone (SA) option. A standalone cell may need to broadcast both SSB and remaining minimum system information (RMSI), for example, with SIB1 and SIB2. A non-standalone cell may only need to broadcast SSB, without broadcasting RMSI. In a single carrier in NR, multiple SSBs may be sent in different frequencies, and may include the different types of SSBs.

Example Control Resource Sets (CORESETs)

A control resource set (CORESET) for an orthogonal frequency division multiple access (OFDMA) system (e.g., a communications system transmitting physical downlink control channels (PDCCHs) using OFDMA waveforms) may comprise one or more control resource (e.g., time and frequency resources) sets, configured for conveying PDCCH, within the system bandwidth (e.g., a specific area on the New Radio (NR) Downlink Resource Grid) and a set of parameters used to carry PDCCH/downlink control information (DCI). For example, a CORESET may be similar in area to an LTE PDCCH area (e.g., the first 1, 2, 3, 4 orthogonal frequency division multiplexed (OFDM) symbols in a subframe).

Within each CORESET, one or more search spaces (e.g., common search space (CSS), UE-specific search space (USS), etc.) may be defined for a given user equipment (UE). Search spaces are generally areas or portions where a communication device (e.g., a UE) may look for control information.

According to aspects of the present disclosure, a CORESET is a set of time and frequency domain resources, defined in units of resource element groups (REGs). Each REG may comprise a fixed number (e.g., twelve) tones/subcarriers in one symbol period (e.g., a symbol period of a slot), where one tone in one symbol period is referred to as a resource element (RE). A fixed number of REGs, such as six, may be included in a control channel element (CCE). Sets of CCEs may be used to transmit NR-PDCCHs, with different numbers of CCEs in the sets used to transmit NR-PDCCHs using differing aggregation levels. Multiple sets of CCEs may be defined as search spaces for UEs, and thus a NodeB or other base station (BS) may transmit an NR-PDCCH to a UE by transmitting the NR-PDCCH in a set of CCEs that is defined as a decoding candidate within a search space for the UE. The UE may receive the NR-PDCCH by searching in search spaces for the UE and decoding the NR-PDCCH transmitted by the NodeB.

As noted above, different aggregation levels may be used to transmit sets of CCEs. Aggregation levels may be generally be defined as the number of CCEs that consist of a PDCCH candidate and may include aggregation levels 1, 2, 4, 8, and 18, which may be configured by a radio resource control (RRC) configuration of a search space set (SS-set). A CORESET may be linked with the SS-set within the RRC configuration. For each aggregation level, the number of PDCCH candidates may be RRC configurable.

Operating characteristics of a NodeB or other BS in an NR communications system may be dependent on a frequency range (FR) in which the system operates. A frequency range may comprise one or more operating bands (e.g., "n1" band, "n2" band, "n7" band, and "n41" band), and a communications system (e.g., one or more NodeBs and UEs) may operate in one or more operating bands. Frequency ranges and operating bands are described in more detail in "Base Station (BS) radio transmission and reception" TS38.104 (Release 15), which is available from the 3GPP website.

As described above, a CORESET is a set of time and frequency domain resources. The CORESET can be configured for conveying PDCCH within system bandwidth. A UE may determine a CORESET and monitor the CORESET for control channels. During initial access, a UE may identify an initial CORESET (CORESET #0) configuration from a field (e.g., pdcchConfigSIB1) in a maser information block (MIB). This initial CORESET may then be used to configure the UE (e.g., with other CORESETs and/or bandwidth parts (BWPs) via dedicated (UE-specific) signaling. When the UE detects a control channel in the CORESET, the UE attempts to decode the control channel and communicates with the transmitting BS (e.g., the transmitting cell) according to the control data provided in the control channel (e.g., transmitted via the CORESET).

In some cases, CORESET #0 may include different numbers of resource blocks (RBs). For example, in some cases, CORESET #0 may include one of 24, 48, or 96 RBs. For other CORESETSs, a 45-bit bitmap may be used to configure available RB-groups, where each bit in the bitmap is with respect to 6-RBs within a BWP and a most significant bit corresponds to the first RB-group in the BWP.

According to aspects of the present disclosure, when a UE is connected to a cell (or BS), the UE may receive a master information block (MIB). The MIB can be in a synchronization signal and physical broadcast channel (SS/PBCH) block (e.g., in the PBCH of the SS/PBCH block) on a synchronization raster (sync raster). In some scenarios, the sync raster may correspond to a synchronization signal block (SSB). From the frequency of the sync raster, the UE may determine an operating band of the cell. Based on a cell's operation band, the UE may determine a minimum channel bandwidth and a subcarrier spacing (SC S) of the channel. The UE may then determine an index from the MIB (e.g., four bits in the MIB, conveying an index in a range 0-15).

Given this index, the UE may look up or locate a CORESET configuration (this initial CORESET configured via the MIB is generally referred to as CORESET #0). This may be accomplished from one or more tables of CORESET configurations. These configurations (including single table scenarios) may include various subsets of indices indicating valid CORESET configurations for various combinations of minimum channel bandwidth and subcarrier spacing (SCS). In some arrangements, each combination of minimum channel bandwidth and SCS may be mapped to a subset of indices in the table.

Alternatively or additionally, the UE may select a search space CORESET configuration table from several tables of CORESET configurations. These configurations can be based on a minimum channel bandwidth and SCS. The UE may then look up a CORESET configuration (e.g., a Type0-PDCCH search space CORESET configuration) from the selected table, based on the index. After determining the CORESET configuration (e.g., from the single table or the selected table), the UE may then determine the CORESET to be monitored (as mentioned above) based on the location (in time and frequency) of the SS/PBCH block and the CORESET configuration.

Figure 5:
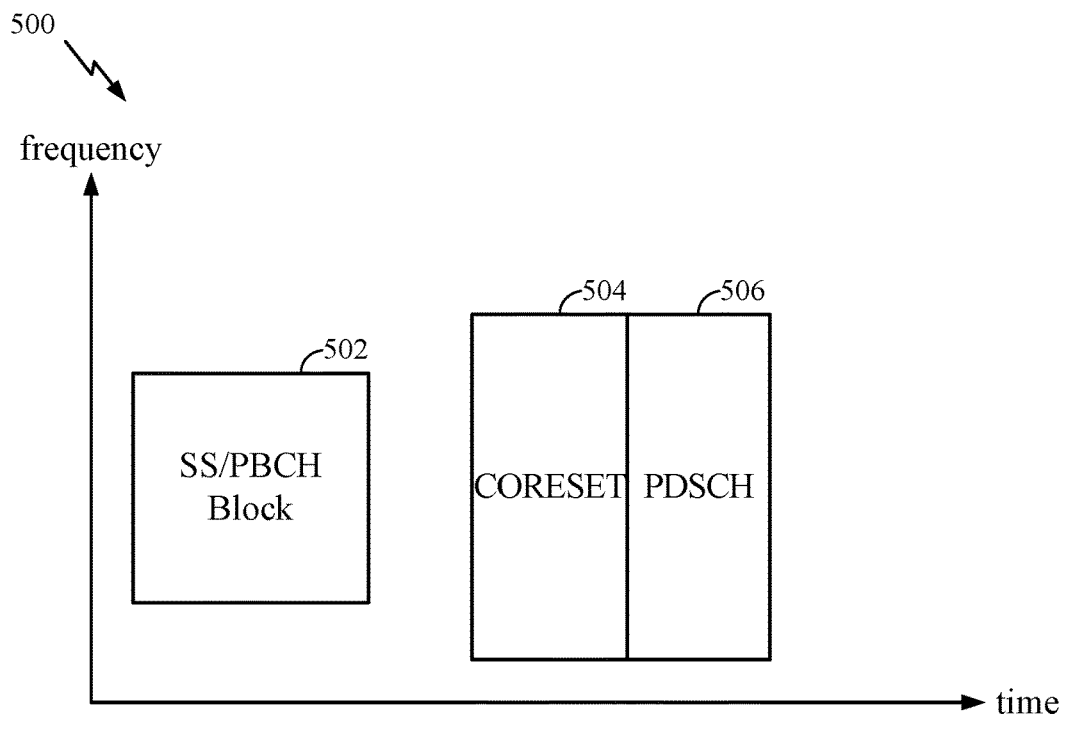
FIG. 5 illustrates an exemplary transmission resource mapping, in accordance with certain aspects of the present disclosure.

FIG. 5 shows an exemplary transmission resource mapping 500, in accordance with certain aspects of the present disclosure. In the exemplary mapping, a BS (e.g., such as BS 110a shown in FIG. 1 and FIG. 2) transmits an SS/PBCH block 502. SS/PBCH block 502 includes an MIB conveying an index to a table that relates the time and frequency resources of CORESET 504 to the time and frequency resources of SS/PBCH block 502.

The BS may also transmit control signaling. In some scenarios, the BS may also transmit a PDCCH to a UE (e.g., such as UE 120a shown in FIG. 1 and FIG. 2) in the (time/frequency resources of the) CORESET. The PDCCH may schedule a PDSCH 506. The BS then transmits the PDSCH to the UE. The UE may receive the MIB in SS/PBCH block 502, determine the index, look up a CORESET configuration based on the index, and determine the CORESET from the CORESET configuration and SS/PBCH block 502. The UE may then monitor the CORESET, decode the PDCCH in the CORESET, and receive PDSCH 506 that was allocated by the PDCCH.

Different CORESET configurations may have different parameters that define a corresponding CORESET. For example, each configuration may indicate a number of resource blocks (RBs) (e.g., 24, 48, or 96), a number of symbols (e.g., 1-3), as well as an offset (e.g., 0-38 RBs) that indicates a location in frequency.

Further, REG bundles may be used to convey CORESETs. REGs in an REG bundle may be contiguous in a frequency and/or a time domain. In certain cases, the time domain may be prioritized before the frequency domain. REG bundle sizes may include: 2, 3, or 6 for interleaved mapping and 6 for non-interleaved mapping.

As noted above, sets of CCEs may be used to transmit NR-PDCCHs, with different numbers of CCEs in the sets used to transmit the NR-PDCCHs using differing aggregation levels.

Example Multiple Transmission Reception Point (Multi-TRP) Beam Failure Recovery (BFR)

As mentioned above, aspects of the present disclosure relate generally to beam failure detection and recovery. In some systems, narrow-beam transmission and reception is useful for improving the link budget at millimeter-wave (mmW) frequencies but may be susceptible to beam failure. In mmW, directional beamforming is used between a user equipment (UE) and a base station (BS), and the UE and the BS communicate via a beam pair link (BPL).

A beam failure generally refers to a scenario in which the quality of a beam falls below a threshold, which may lead to radio link failure (RLF). New Radio (NR) supports a lower layer signaling to recover from beam failure, referred to as beam failure recovery (BFR). For example, instead of initiating a cell reselection when a beam quality becomes too low, a beam pair reselection within the cell may be performed.

Beam failure may be detected by monitoring a beam failure detection (BFD) reference signal (RS) and assessing if a beam failure trigger condition has been met. Generally, a UE monitors the BFD RS from a primary cell (Pcell), a primary secondary cell (PScell), or a secondary cell (Scell) (e.g., a coverage area of a BS). In some examples, BFD is triggered if an estimated block error rate (BLER) of RSs associated with a configured control resource set (CORE- SET) is above a threshold (e.g., 10%). In some examples, the UE detects beam failure when the reference signal receive power (RSRP) or other signal quality measurement (based on the BFD RS) of a BPL fails to satisfy (e.g., is below) a threshold. Once BFD is detected, the UE initiates BFR.

In 3GPP NR Release 16 (R16), a multiple transmission reception point (multi-TRP) operation was introduced to increase system capacity, as well as reliability. Accordingly for BFR, in some examples, the UE may be configured to provide per-TRP BFR, which enables separate BFD and separate candidate beam detection (CBD) for the beams corresponding to a TRP in a component carrier (CC) that is configured with two values of CORESET pool indices. In the absence of per-TRP BFR, BFD and CBD may not be triggered until all beams in that CC become weak. With per-TRP BFR, when beams for a given TRP become weak, beam recovery procedures can be performed, and a best beam corresponding to that TRP can be identified without having to wait for the beams of the other TRPs to also become weak, and thus reliability and communications efficiency can be enhanced.

Figure 6:
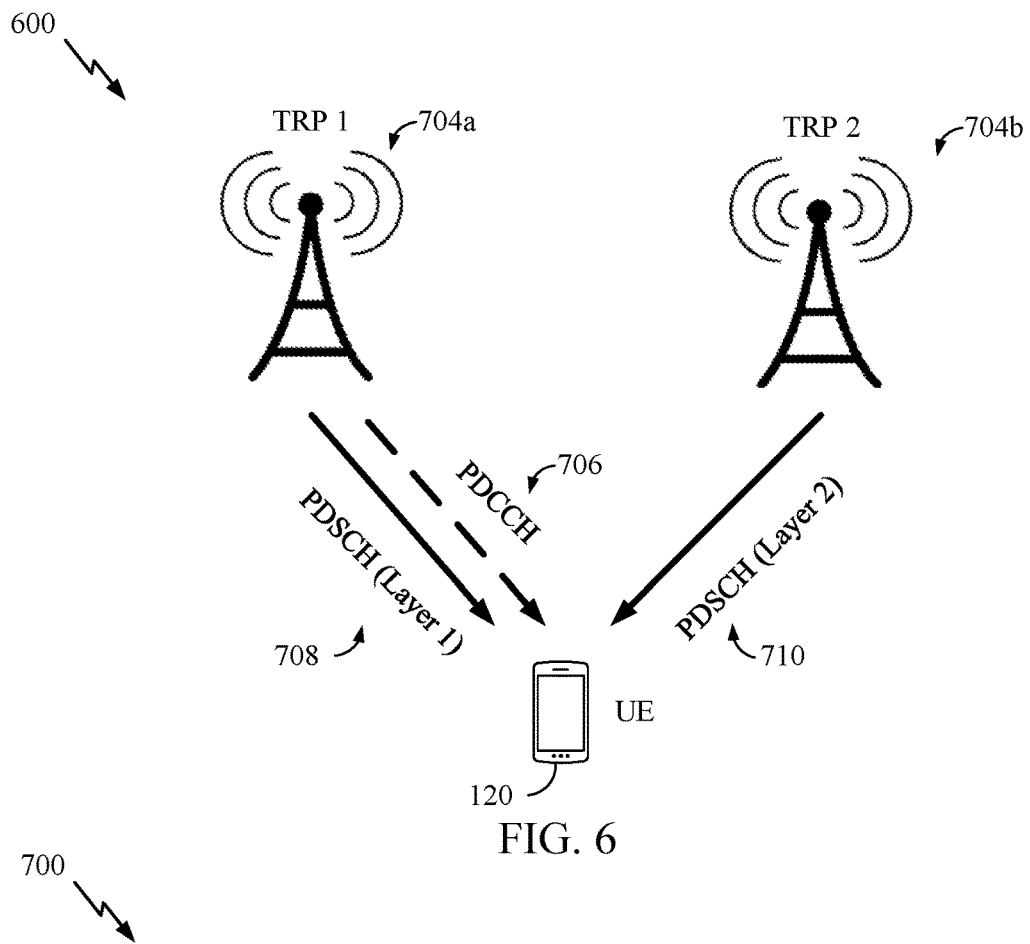
FIGS. 6 and 7 illustrate examples of multi-transmission reception point (multi-TRP) systems, in which aspects of the present disclosure may be practiced.
Figure 7:
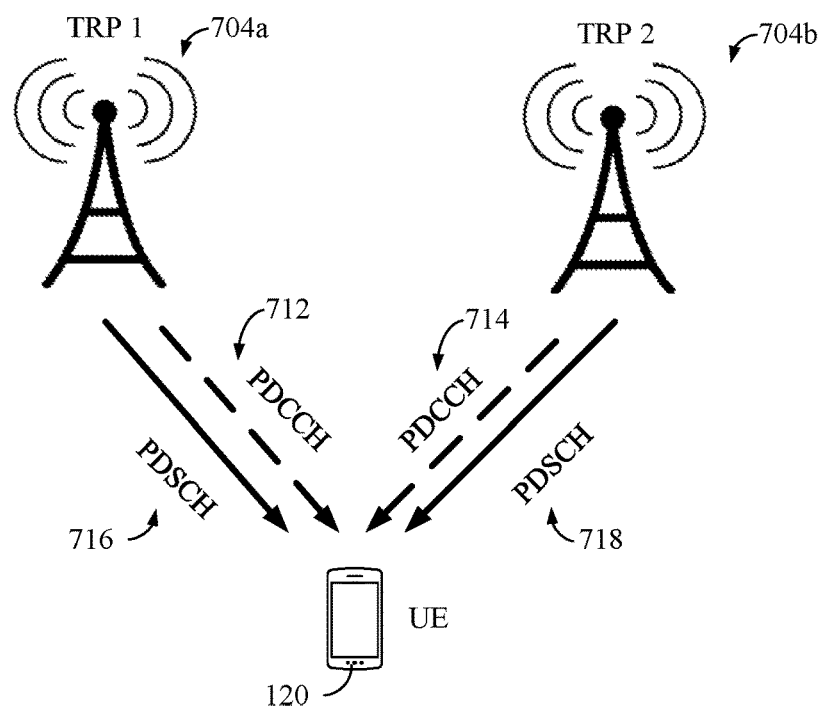

FIGS. 6 and 7 illustrate examples of wireless communication systems 600 and 700, respectively, which support BFR for a multi-TRP in a PCell, PScell, or Scell, in accordance with certain aspects of the present disclosure.

As shown in the examples of FIG. 6 FIG. 7, multi-TRP operation wireless communication systems may include a UE 120 and a number of TRPs 704a-b (collectively referred to herein as TRPs 704) associated with a PCell/PScell/Scell, which may be examples of the corresponding devices described herein. TRPs 704a-b may, in this example, provide a multi-TRP PCell/PScell/Scell in which a first beam of a first TRP, e.g., TRP 704a, and a second beam of a second TRP, e.g., TRP 704b, provide for communications with UE 120.

In some cases, as shown in the example multi-TRP operation wireless communication system 600 of FIG. 6, multi-TRP transmissions may be configured based on a single downlink control information (DCI) communication which (e.g., transmitted in a physical downlink control channel (PDCCH) 706 from TRP 704a) schedules downlink (DL) shared channel transmissions, such as physical downlink shared channel PDSCH 708 (e.g., Layer 1 (L1) PDSCH 708) transmitted from TRP 704a via the first beam and PDSCH 710 (e.g., Layer 2 (L2) PDSCH 710) transmitted from TRP 704b via the second beam. Configuration based on a single DCI communication may allow different TRPs (i.e., TRP 704a and TRP 704b) to transmit different spatial layers in overlapping RBs/symbols. In some examples, different TRPs 704 may transmit different RBs multiplexed on a DL carrier using frequency division multiplexing (FDM) techniques or different orthogonal frequency division multiplexing (OFDM) symbols multiplexed on the DL carrier using time division multiplexing (TDM) techniques. Multi-TRP operations configured based on a single DCI communication may result in ideal backhaul or backhaul with a small delay.

In some other cases, as shown in example multi-TRP operation wireless communication system 700 of FIG. 7, multi-TRP transmissions may be configured based on multiple DCI communications. In particular, a first DCI (e.g., transmitted in PDCCH 712 from TRP 704a) schedules a first DL shared channel transmission (e.g., PDSCH 716 transmitted from TRP 704a via the first beam), while a second DCI (e.g., transmitted in PDCCH 714 from TRP 704b) schedules a second DL shared channel transmission (e.g., PDSCH 718 transmitted from TRP 704b via the second beam). TRP 704 differentiation at UE 120, in some cases,
may be based on a value of a CORESET pool index (e.g., CORESETPoolIndex), where each CORESET (e.g., up to a maximum of five CORESETs) can be configured with a value of a CORESET pool index. To support multiple PDCCH monitoring (e.g., at UE 120), as shown in FIG. 7, up to a maximum of five CORESETs can be configured with up to three CORESETs per TRP.

Figure 8:
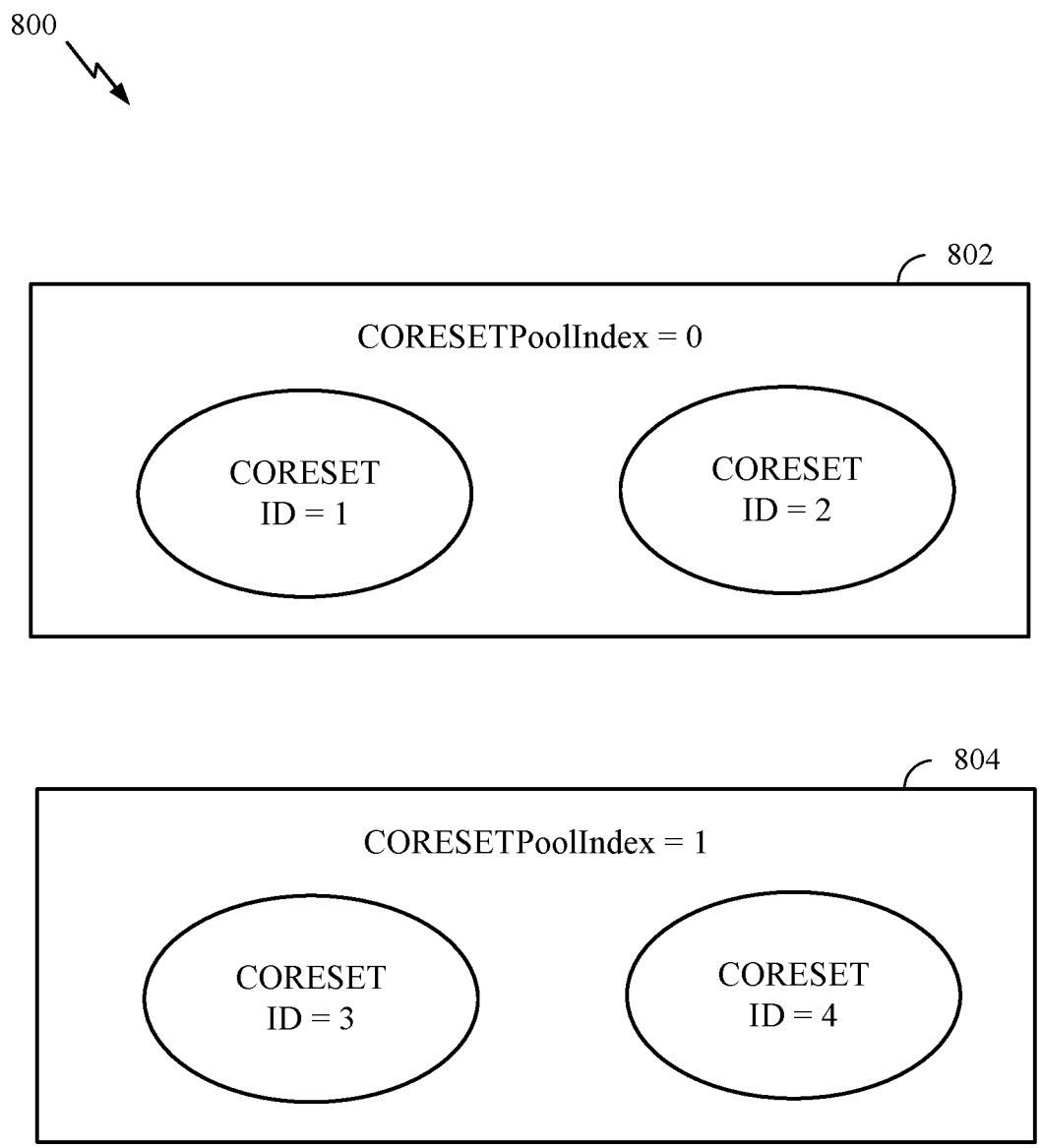
FIG. 8 illustrates example control resource set (CORESET) groups, in accordance with certain aspects of the present disclosure.

FIG. 8 illustrates example CORESET groups 800, in accordance with certain aspects of the present disclosure. As shown in FIG. 8, in some examples, the UE may be configured by a higher layer parameter, PDCCH-Config (e.g., a condition in 3GPP specification used to determine whether UE 120 is configured with multi-DCI based multi-TRP), which contains two different values of CORESET-PoolIndex in CORESETs for the active BWP of a serving cell. In some examples, the value of CORESETPoolIndex may be zero at 802 or one at 804, which groups the CORESETs into two groups, which may correspond to the different TRPs 704. Beyond the CORESET pool index distinction, UE 120 is oblivious to differences beyond identifying that different TRPs are used within the wireless communication system. Only some CCs may be configured with two values of CORESET PoolIndex, while other CCs may not be configured with two values of CORESET PoolIndex, and thus, BFD/BFR on a per-TRP 704 basis may be provided for CCs that are configured with two values of CORESET PoolIndex.

For example, in the non-limiting example shown in FIG. 7, the Pcell/Pscell/Scell may be configured with two values of CORESET pool index, with one value associated with the first TRP, TRP 704a, and a second value associated with second TRP, TRP 704b. In this case, each TRP 704 may transmit one or more BFD RSs that may be monitored by UE 120. In this example, UE 120 may determine that the first beam of the first CORESET pool index value (e.g., CORESETPoolIndex=0) has a channel metric (e.g., an RSRP)) that is below a threshold value (e.g., when radio link quality is worse than a threshold Q_out for all the RSs in BFD resources that are associated with the first CORESET pool index value).

Accordingly, a UE may be configured for a carrier (e.g., an individual CC, BWP, and the like) associated with the Pcell/Pscell/Scell that is configured with the first CORESET pool index value (e.g., CORESETPoolIndex=0) and a second CORESET pool index value (e.g., CORESETPoolIndex=1). The first CORESET pool index value may be associated with the first TRP, TRP 704a, of the Pcell/Pscell/Scell, and the second CORESET pool index value may be associated with the second TRP, TRP 704b, of the Pcell/Pscell/Scell. Each TRP 704 may transmit one or more BFD RSs that are associated with their respective value of the CORESET pool index. This may include two sets of BFD RSs (e.g., failureDetectionResources) being configured, with each set corresponding to a different value of a CORESET pool index.

In another example this may include each RS (e.g., each resource within failureDetectionResources) being configured with a CORESET pool index value. If the resource is not configured with a CORESET pool index value, it may be considered associated with CORESET pool index value 0 (e.g., the first CORESET pool index value).

Additionally, a resource may be configured with both values of CORESET pool indices. When the RSs (e.g., failureDetectionResources) are not configured, the RS sets indicated in the active transmission configuration indicator (TCI) states of CORESETS configured with CORESET pool index value equal to 0 or 1 (e.g., either CORESET pool index value) may determine the first or second set of resources, respectively. BFD for a value of CORESET pool index may be declared when the radio link quality is worse than Q_out for all the RSs and the BFD resources that are associated with that CORESET pool index value.

UE 120 may also receive or otherwise identify an indication of a set of candidate beams available for a BFR procedure. The set of candidate beams may include a first subset of candidate beams associated with the first CORESET pool index value (e.g., CORESETPoolIndex=0) and a second subset of candidate beams associated with the second CORESET pool index value (e.g., CORESETPoolIndex=1). In one example, this may include two lists of candidate beams (e.g., candidateBeamRSList) being configured, each corresponding to a different CORESET pool index value. That is, UE 120 may be separately configured with the first subset of candidate beams associated with the first CORESET pool index value and the second subset of candidate beams associated with the second CORESET pool index value.

UE 120 may detect or otherwise determine that a beam failure has occurred (e.g., the RSRP on the active beam is less than Q_out) on the carrier of the active beam (e.g., either the first beam or the second beam) of the Pcell/Pscell/Scell. UE 120 may, based on the detected beam failure, select a new candidate beam from the set of candidate beams based on monitoring a resource (e.g., candidate beam detection (CBD) resources) associated with the first CORESET pool index value or the second CORESET pool index value. When BFD is declared for a CORESET pool index value, a new candidate beam (e.g., q_new) may be identified from within the candidate RSs associated with the same CORESET pool index value. In other words, UE 120 may select a new candidate beam from the set of candidate beams based on monitoring a resource (e.g., CBD resource(s)) associated with the first CORESET pool index value when a first beam experiences beam failure or the second CORESET pool index value when a second beam experiences beam failure. UE 120 may transmit or otherwise convey an access message to the Pcell/Pscell/Scell (e.g., via TRP 704a if the conditions on the carrier permit and/or via TRP 704b) indicating the new candidate beam during the BFR procedure.

In certain aspects, UE 120 may receive or otherwise identify a first subset of random access resources (e.g., random access channel (RACH) resources/random access preamble indices) associated with the first subset of CBD resources corresponding to the first subset of candidate beams and a second subset of random access resources associated with a second subset of CBD resources corresponding to the second subset of candidate beams. That is, dedicated RACH resources for BFR may also be associated with each of the different CORESET pool index values. In some examples, this may include an implicit indication based on an association of a RACH resource/random access preamble index with a candidate beam RS (e.g., as each candidate beam RS is already associated with a CORESET pool index value). The network (e.g., Pcell/Pscell/Scell) may determine which TRP/CORESET pool index value has experienced a beam failure (and the corresponding new beam q_new) in the Pcell/Pscell/Scell based on the resource/random access preamble index of the received RACH (e.g., based on the random access resource used for transmitting the access message).

In some examples this may include two lists of RACH resources/random access preamble indices being configured, with each list of RACH resource/random access preamble index being associated with one of the CORESET pool index values. For example, UE 120 may receive an indication of a first set of random access resources associated with the first CORESET pool index value and a second set of random access resources associated with the second CORESET pool index value. Thus, in one example, UE 120 may determine that the new candidate beam is associated with the first subset of candidate beams and select a random access resource from the first set of random access resources corresponding to the new candidate beam to transmit the access message. In another example, UE 120 may determine that the new candidate beam is associated with the second subset of candidate beams and select a random access resource from the second set of random access resources corresponding to the new candidate beam to transmit the access message.

UE 120 may transmit, or otherwise convey, the access message utilizing the corresponding RACH resources/random access preamble to carry or otherwise convey an indication of the CORESET pool index value associated with the beam failure. UE 120 may reset the active beam associated with the TRP 704 experiencing the beam failure.

In some examples, this may include updating various quasi-colocation (QCL) relationships. For example, UE 120 may determine that the new candidate beam is associated with the first CORESET pool index value and, therefore, update the QCL relationship for a CORESET with index 0 (e.g., the CORESET that is used for common search space procedures). The updated QCL relationship may correspond to the QCL configuration of the new candidate beam. That is, when the new candidate beam (e.g., q_new) corresponds to CORESET pool index value 0, the QCL assumptions for CORESET 0 may be updated (e.g., after 28 symbols after the last symbol carrying PDCCH). Accordingly, the updated QCL configuration may occur after a threshold time period. The QCL assumption (e.g., QCL configuration) for CORESET 0 may not be updated when the new candidate beam (e.g., q_new) corresponds to CORESET pool index value 1 (e.g., the second CORESET pool index value). In some examples, this may be based on CORESET 0 being typically associated with CORESET pool index value 0.

In some examples, this may include UE 120 determining that the new candidate beam is associated with the first or second CORESET pool index values. Accordingly, UE 120 may update the QCL relationship for each CORESET associated with the first CORESET pool index value or second CORESET pool index value, respectively. Again, the updated QCL relationship may correspond to the QCL configuration of the new candidate beam. That is, when the new candidate beam (e.g., q_new) corresponds to either CORESET pool index value, the QCL assumption for all CORESETS associated with the same CORESET pool index value may be reset to the new candidate beam (e.g., 28 symbols after the last symbol carrying PDCCH). The set of activated TCI states for a PDSCH that correspond to the same value of CORESET pool index may be reset to the new candidate beam. Accordingly, UE 120 may update the activated set of TCI states for a data channel to a TCI state of the new candidate beam.

In certain aspects, this may include UE 120 determining that the new candidate beam is associated with the first or second CORESET pool index value. UE 120 may update the CORESET pool index value of a common CORESET accordingly. For example, UE 120 may update the CORESET pool index value of the common CORESET to correspond to the CORESET pool index value of the new candidate beam. That is, when the new candidate beam corresponds to the first or second CORESET pool index value and one CORESET (e.g., the common CORESET) is configured for BFR, the CORESET pool index value of the CORESET that is associated with recovery search space ID(s) (e.g., recoverySearchSpaceId(s)) may be reset to the CORESET pool index value that the new candidate beam corresponds to.

In some examples, UE 120 may treat the second CORESET pool index value (e.g., CORESETPoolIndex=1) as an SCell for the BFR procedure. That is, UE 120 may determine that the beam failure on the active beam of the PCell is associated with the first CORESET pool index value (e.g., CORESETPoolIndex=0 and is associated with the first TRP, TRP 704*a*) and, therefore, perform a PCell BFR procedure. When BFD is detected for the first CORESET pool index value (e.g., CORESETPoolIndex=0), the procedures corresponding to a PCell BFR procedure may be followed (e.g., RACH transmission, PDCCH reception in a recovery search ID, etc.). However, UE 120 may determine that the beam failure on the active beam of the PCell is associated with the second CORESET pool index value (e.g., CORESETPoolIndex=1 and is associated with the second TRP, TRP 704*b*) and, therefore, perform an SCell BFR procedure. If BFD is detected for the second CORESET pool index value (e.g., CORESETPoolIndex=1) for the PCell, the procedures corresponding to an SCell BFR procedure may be followed. For example, a link recovery request (LRR) message may be transmitted in a configured PUCCH resource, and a grant scheduling an uplink (UL) transmission for UE 120 may be received in response. In this situation, the medium access control (MAC) control element (CE) (MAC-CE) beam failure response may convey an indication of an additional Ci field (where i is the CellIndex) and corresponding candidate RS ID fields (e.g., when Ci=1) associated with CORESET pool index value 1 in the PCell.

Examples of BFD, CBD, beam recovery, and the like, are discussed with reference to FIG. 9 which generally illustrates a PCell BFR procedure and with reference to FIG. 10 which generally illustrates an SCell BFR procedure.

Figure 9:
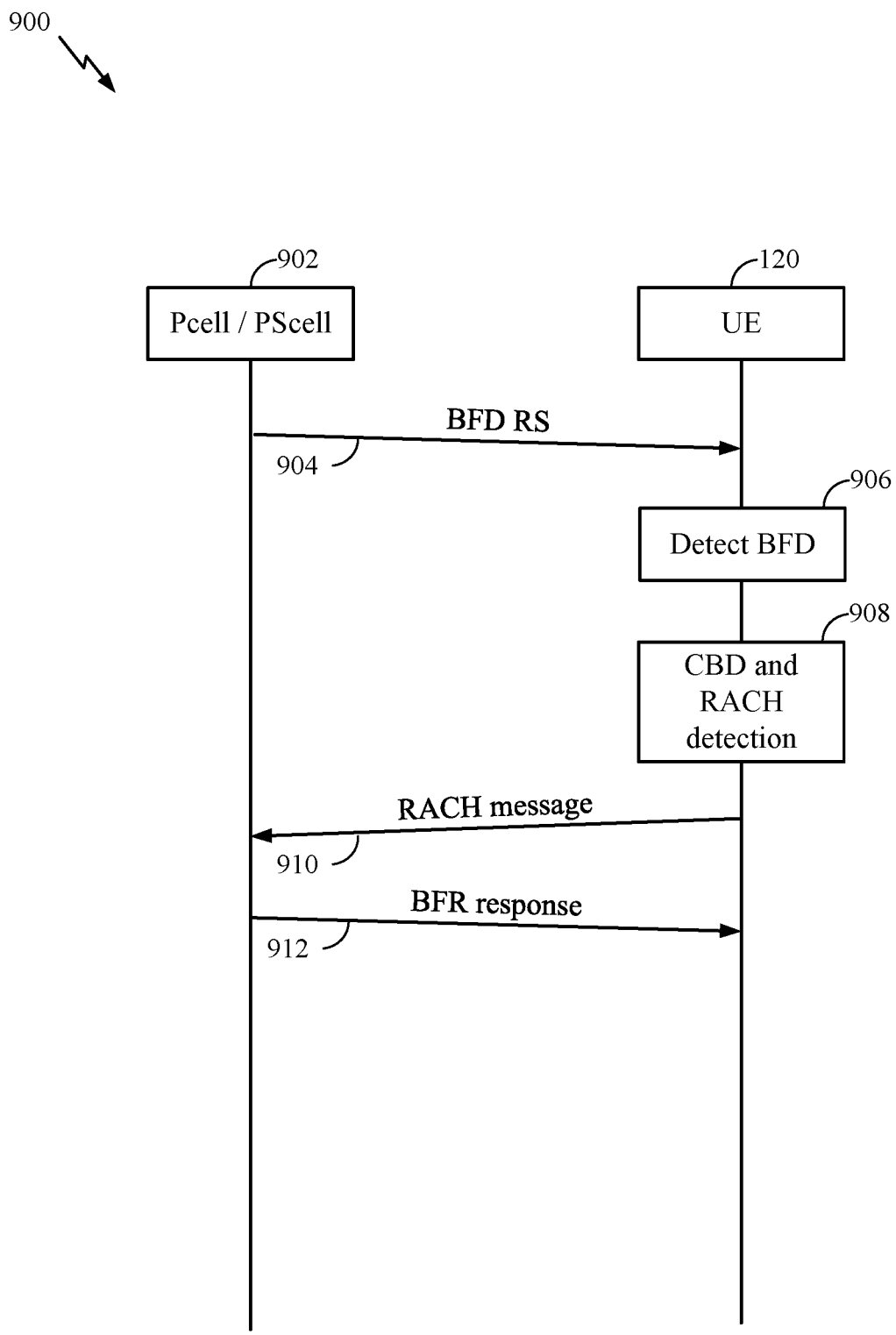
FIG. 9 is a call flow diagram illustrating an example beam failure recovery (BFR) process, in accordance with certain aspects of the present disclosure.

FIG. 9 illustrates an example of a process 900 that supports BFR for multi-TRPs in a PCell/Pscell, in accordance with certain aspects of the present disclosure. In some examples, process 900 may implement aspects of wireless communication network 100. Features of process 900 may be implemented by a PCell/PScell 902 and/or a UE 120. In some examples, PCell/PScell 920 may be associated with multiple TRPs 704.

PCell/PScell 902 may configure UE 120 with a carrier that is configured with, or otherwise associated with, a first CORESET pool index value (e.g., CORESETPoolIndex=0) and a second CORESET pool index value (e.g., CORESETPoolIndex=1). PCell/PScell 902 may also configure UE 120 with a set of candidate beams available for a BFR procedure, the set of candidate beams including a first subset of candidate beams associated with the first CORESET pool index value and a second subset of candidate beams associated with the second CORESET pool index value.

At 904, PCell/PScell 902 may transmit (and UE 120 may receive), a configuration for BFD RSs. That is, BFD may be based on periodic channel state information-reference signal (CSI-RS) resources configured by radio resource control (RRC) (e.g., RRC parameter failureDetectionResoruces). Up to two single port RSs may be configured. If not configured, the RS sets indicated by the active TCI states of CORESETs monitored by UE 120 may be used. For an active TCI state of a CORESET, there may be two RS indices, e.g., with QCL Type-D, that may be used.

At 906, UE 120 may determine or otherwise declare a beam failure on an active beam of PCell/PScell 902 associated with the first CORESET pool index value or the second CORESET pool index value. In some examples, the physical (PHY) layer of UE 120 may assess the radio link quality according to the BFD set against a threshold (e.g., Q_out). If the radio link quality is worse than Q_out for all of the RSs in the BFD resource set, the PHY layer may provide an indication to higher layers, e.g., an indication that a beam failure has been detected.

At 908, UE 120 may select a new candidate beam based on monitoring a resource associated with the first CORESET pool index value or the second CORESET pool index value, e.g., perform CBD. In some examples, CBD may be based on periodic CSI-RSs/SSBs configured by RRC (e.g., RRC parameter candidateBeamRSList). In some examples, up to 16 resources may be configured with the corresponding random access preamble index (e.g., for RACH). Upon request from higher layers, UE 120 may provide a reference signal index and RSRP among the lists that have equal or larger RSRP values than q_in (e.g., a configurable threshold). UE 120 may initiate RACH procedures (e.g., contention-free RACH procedures) based on the random access resource (e.g., random access preamble index) associated with a selected RS index with an RSRP value above the threshold (e.g., RS index q_new). Accordingly, at 910, UE 120 may transmit (and PCell/PScell 902 may receive) a RACH message, e.g., the access message.

At 912, PCell/PScell 902 may transmit (and UE 120 may receive) a BFR response. That is, UE 120 may monitor PDCCH in a search space set provided by a parameter recoverySearchSpaceID for detection of a DCI format that is cyclic redundancy check (CRC) scrambled by a cell radio network temporary identifier (C-RNTI) or a modulation and coding scheme RNTI (MCS-C-RNTI) starting from slot n+4. This may correspond to a random access response (e.g., BFR response in this case). If UE 120 receives the PDCCH within a window, the BFR procedure may be considered complete. In some aspects, the CORESET associated with the secondary synchronization signal (SSS) provided by recoverySearchSpaceID may not be used for any other SSS.

Typically, various QCL assumptions may be adopted after RACH. For PDCCH monitoring and an SSS provided by recoverySearchSpaceID and for corresponding PDSCH receptions, UE 120 may assume the same QCL parameters as the ones associated with the RS index q_new (e.g., the QCL parameters of the new candidate beam) until UE 120 receives, e.g., by higher layers, an activation for a TCI state, or any of the parameters TCI-StatesPDCCH-ToAddList and/or TCI-StatesPDCCH-ToReleaseList. After the 28th symbol from a last symbol of a first PDCCH reception and a SSS provided by recoverySearchSpaceID where UE 120 detects a DCI format with CRC scrambled by a C-RNTI or an MCS-C-RNTI, UE 120 may assume the same QCL parameters as the ones associated with the RS index q_new for PDCCH monitoring in a CORESET with pool index value 0.

However, according to certain aspects, UE 120 may monitor for an access response message (e.g., the BFR response) on a first recovery search configured with a first CORESET that is associated with the first CORESET pool index value or on a second recovery search space configured with a second CORESET that is associated with the second CORESET pool index value. That is, two different CORESETS may be associated with two different recovery search spaces (e.g., two recoverySearchSpaceIDs can be configured). As mentioned, the two CORESETs may be configured with different CORESET pool index values. A recoverySearchSpaceID may be associated with a CORESET pool index value through the corresponding CORESET. Accordingly, in some examples, UE 120 may determine that the new candidate beam is associated with the first subset of candidate beams and monitor for an access response message (e.g., the BFR response) on the first recovery search space. Similarly, in some other examples, UE 120 may determine that the new candidate beam is associated with the second subset of candidate beams and monitor for an access response message (e.g., the BFR response) on the second recovery search space. UE 120 may receive a control channel signal (e.g., PDCCH, which may include the access response message, or BFR response in this example) in the corresponding recovery search space and determine that the BFR procedure is complete based, at least in part, on receiving the control channel signal in the corresponding recovery search space.

In some aspects, only one CORESET may be used for BFR purposes. For example, UE 120 may monitor for the access response message (e.g., the BFR response) on a first recovery search space associated with the first CORESET pool index value or on a second recovery search space associated with the second CORESET pool index value. In this example, the first and second recovery search spaces may be associated with a common CORESET (e.g., the single CORESET used for BFR purposes). In one example, this may include two recoverySearchSpaceIDs being configured, both associated with the same CORESET. The first recovery search space (e.g., the first recoverySearchSpaceId) may be associated with the first CORESET pool index value (e.g., CORESETPoolIndex=0) and the second recovery search space (e.g., the second recoverySearchSpaceID) may be associated with the second CORESET pool index value (e.g., CORESETPoolIndex=1). This association between the second recovery search space and the second CORESET pool index value may be a direct association (e.g., not through the CORESET).

If the RACH message transmitted at 910 in slot n is associated with a new candidate beam (e.g., q_new) that is associated with a CORESET pool index value, UE 120 may monitor PDCCH in a search space set provided by recoverySearchSpaceID that is associated with the same CORESET pool index value for detection of a DCI format with CRC scrambled by a C-RNTI or an MCS-C-RNTI starting from slot n+4. The BFR procedure for a CORESET pool index value may be completed at 912 when UE 120 receives a PDCCH (e.g., the BFR response) in the corresponding recovery search space. The PDCCH, and a corresponding PDSCH, may use the same beam as q_new uses (e.g., the new candidate beam).

Accordingly, UE 120 may determine that the new candidate beam is associated with the first subset of candidate beams and monitor for an access response message (e.g., the BFR response) on the first recovery search space. Similarly, UE 120 may determine that the new candidate beam is associated with the second subset of candidate beams and monitor for an access response message (e.g., the BFR response) on the second recovery search space. UE 120 may receive a control channel signal (e.g., PDCCH, which may be an example of the access response message, or BFR response in this example) in the corresponding recovery search space and determine that the BFR procedure is complete, at 912, based on receiving the control channel signal in the corresponding recovery search space.

Figure 10:
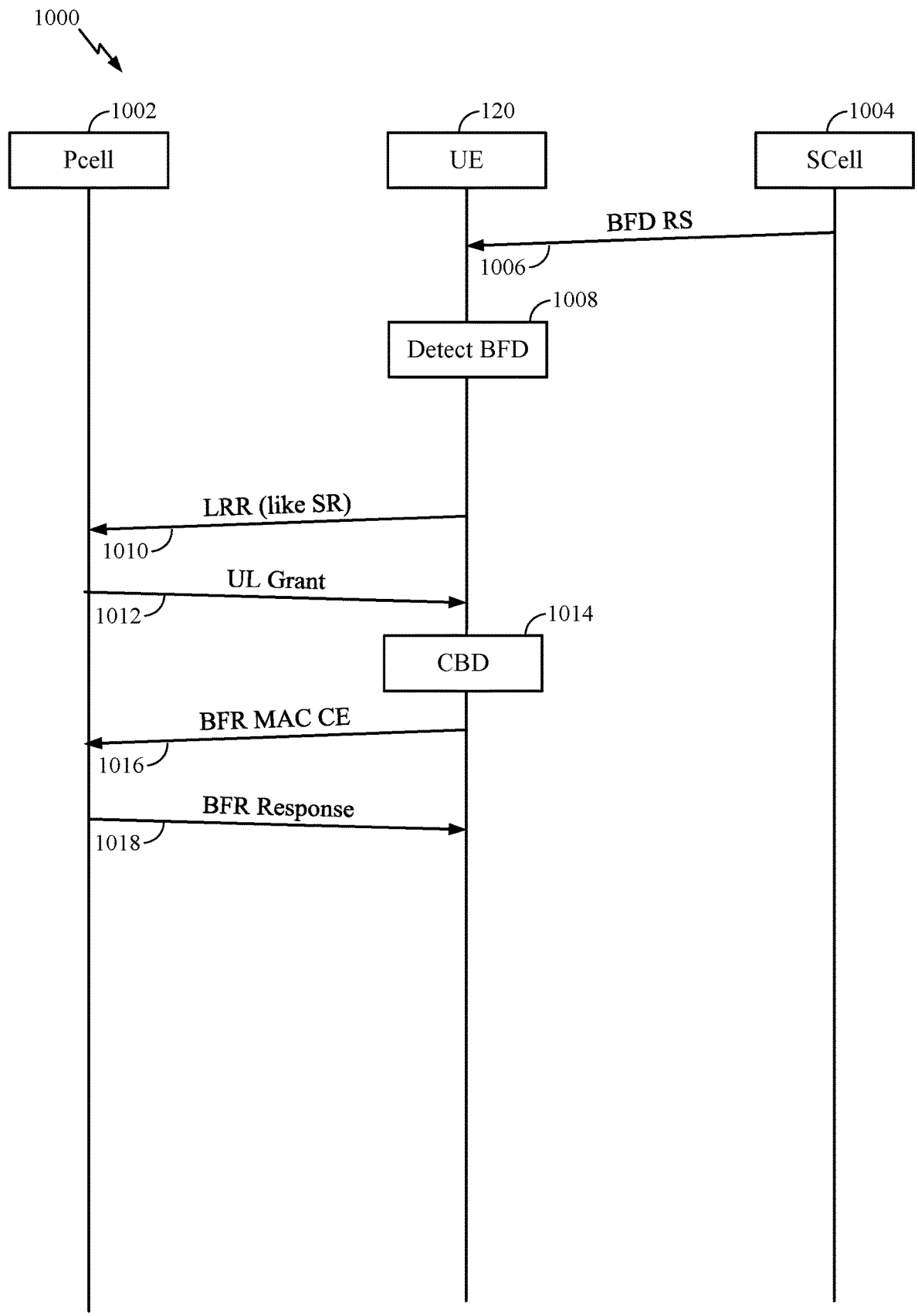
FIG. 10 is a call flow diagram illustrating another example BFR process, in accordance with certain aspects of the present disclosure.

FIG. 10 illustrates an example of a process that supports BFR for multi-TRPs in a PCell, in accordance with certain aspects of the present disclosure. In some examples, process 1000 may implement aspects of wireless communication network 100. Aspects of process 1000 may be implemented by a PCell 1002, a UE 120, and/or an SCell 1004, which may be examples of corresponding devices described herein. In some aspects, PCell 1002 and/or SCell 1004 may each be associated with multiple TRPs 704, respectively. Process 1000 illustrates an example of an SCell BFR procedure that may be modified, at least in some aspects, according to the described techniques when a carrier on PCell 1002 experiences beam failure.

PCell 1002 may configure UE 120 with a carrier that is configured with, or otherwise associated with, a first CORESET pool index value (e.g., CORESETPoolIndex=0) and a second CORESET pool index value (e.g., CORESETPoolIndex=1). PCell 2002 may also configure UE 120 with the set of candidate beams available for a BFR procedure, the set of candidate beams including a first subset of candidate beams associated with the first CORESET pool index value and a second subset of candidate beams associated with the second CORESET pool index value.

At 1006, SCell 1004 may transmit (and UE 120 may receive) a configuration for BFD RSs. That is, BFD may be based on periodic CSI-RS resources configured by RRC (e.g., RRC parameter failureDetectionResources). At 1008, UE 120 may determine or otherwise detect a beam failure on an active beam of SCell 1004 associated with the first CORESET pool index value or the second CORESET pool index value.

At 1008, UE 120 may declare a beam failure and initiate BFR. Although process 1000 illustrates beam failure based on the RSs and BFD based on SCell 1004, similar processes may be used for BFD on PCell 1002. That is, although process 1000 illustrates UE 120 detecting or otherwise declaring BFD on SCell 1004, it is to be understood that, in accordance with the described techniques, UE 120 may similarly detect or otherwise declare BFD on a carrier of PCell 1002.

At 1010, UE 120 may transmit (and PCell 1002 may receive) a LRR message. The LRR message may be transmitted on PCell 1002 (e.g., PUCCH-PCell and/or PUCCH-SCell) in which the PUCCH BFR is configured. The LRR message may be similar to a scheduling request (SR) and use PUCCH format 0 or 1. The LRR message may be transmitted in a UL control channel.

At 1012, PCell 1002 may transmit (and UE 120 may receive) a normal UL grant. The UL grant may include or use C-RNTI/MCS-C-RNTI and may serve as a response message to the LRR message. The UL grant may schedule a PUSCH for UE 120 in which a BFR MAC CE may be transmitted. If UE 120 already has an UL grant configured, the LRR message transmitted at 1010 and the UL grant transmitted at 1012 may be skipped.

At 1014, UE 120 may perform CBD. That is, before sending the BFR response indicating the MAC CE, UE 120 may identify the best new beam (e.g., select a new candidate beam) for the failed SCell 1004 (or PCell 1002 in this example). CBD may be similar to the description provided in process 900 of FIG. 9. Up to 64 resources (e.g., candidateBeamRSSCellList, or candidateBeamRSPCellList in this example) may be configured in the set of candidate beams and they may be transmitted on the failed SCell 1004 (or PCell 1002 in this example) or on another CC in the same band. In some aspects, the BFR procedure illustrated in process 1000 may not include a RACH process and, therefore, CBD resources may not be associated with a RACH resource.

At 1016, UE 120 may transmit (and PCell 1002 may receive) a BFR MAC CE. In some aspects, the BFR MAC CE may carry or otherwise convey an indication of which cell the beam failure has occurred (e.g., an SCell 1004 index, or a PCell 1002 index in this example) and/or identify potential new candidate beams. For example, the BFR MAC CE may include a first row of $C_i$ indications (e.g., up to eight $C_i$ indications), with each $C_i$ indication set to 1 to indicate that BFD has occurred in that CC. For each $C_i$ indication set to 1, a subsequent row in the MAC CE may include an availability indication (AC) field set to 1 indicating that the candidate RS ID field is present. The remaining bits in the row may carry the candidate RS ID. The BFR MAC CE may be transmitted to PCell 1002 and/or SCell 1004 (e.g., may be transmitted to any cell, including the failed cell).

Accordingly, in certain aspects UE 120 may configure the access message (e.g., BFR MAC CE) to indicate the CORESET pool index value associated with the detected beam failure. That is, the MAC CE may explicitly indicate the CORESET pool index value corresponding to the BFD.

At 1018, PCell 1002 may transmit (and UE 120 may receive) a BFR response. In some aspects, the BFR response to the MAC CE may be an UL grant scheduling a new transmission (e.g., with a toggled new data indicator (NDI)) for the same hybrid automatic repeat request (HARM) process as the PUSCH carrying the MAC CE. If the new candidate beam is reported in the BFR MAC CE, 28 symbols from the end of the BFR response (e.g., in the PDCCH), all CORESET beams on the failed cell (e.g., SCell b, or PCell in this example), may be reset to the new candidate beam. If the failed cell is a PUCCH-SCell 1004, the PUCCH-spatialRelationInfo may be configured. If the LLR is not transmitted on the failed cell, PUCCH beams on the failed cell may be reset to the new candidate beam.

After receiving the control channel signal (e.g., PDCCH, which may be an example of the access response message, or BFR response in this example) in the corresponding recovery search space, at 1018, UE 120 may determine that the BFR procedure is complete.

Figure 11A:
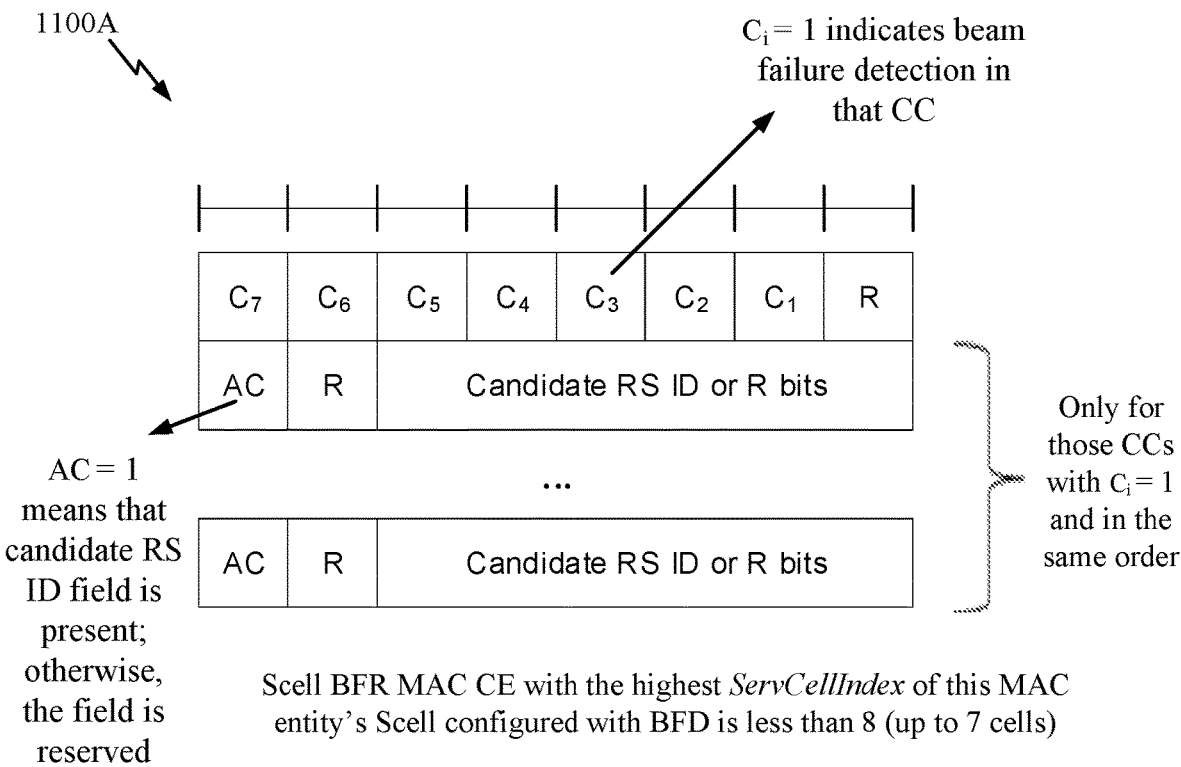
FIGS. 11A and 11B illustrate example BFR medium access control (MAC)-control element (CE) (MAC-CE) structures, in accordance with certain aspects of the present disclosure.
Figure 11B:
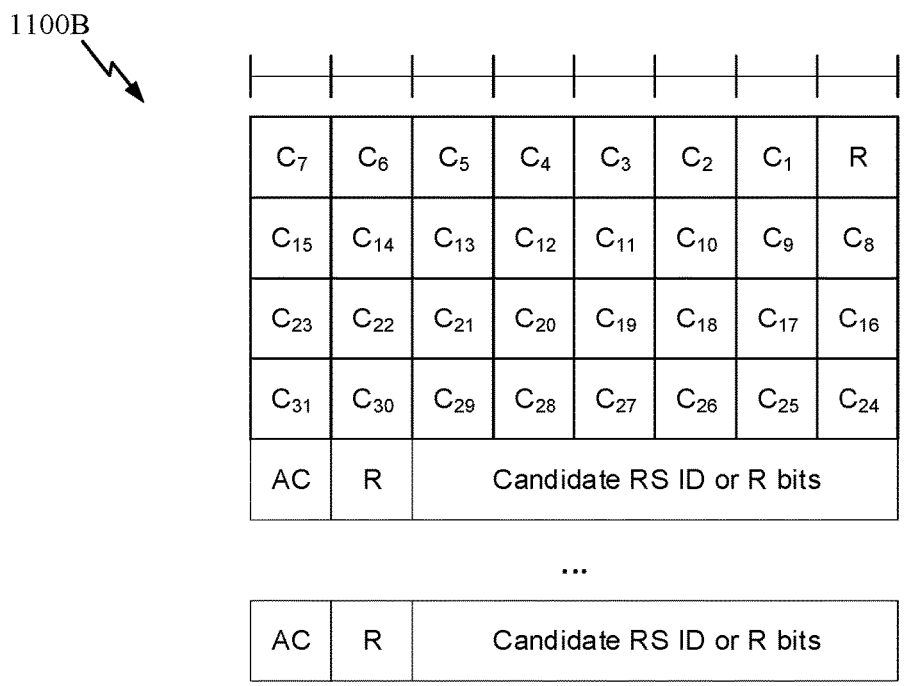

FIGS. 11A and 11B illustrate example MAC-CE structures 1100A and 1100B, respectively, which may be used for BFR purposes, in accordance with certain aspects of the present disclosure. In particular, FIG. 11A shows an example SCell BFR MAC CE with a highest SERVCellIndex less than eight (e.g., MAC-CE structure 1100A includes a first row of up to seven $C_i$ indications for seven SCells). A Ci indication equal to 1 indicates a BFD in that CC. And when Ci=1, the BFR MAC-CE may convey an indication of an additional Ci field and corresponding AC/candidate RS ID fields associated with the CORESET pool index value in the PCell. The AC field may correspond to the candidate RS ID field. As another example, FIG. 11B illustrates an example SCell BFR MAC-CE with a field structure which includes a highest SERVCellIndex greater than 8 (21 in this example).

Example Configuration of Physical Uplink Control Channel (PUCCH)-Beam Failure Recovery (BFR) for Transmission Reception Point (TRP) Specific BFR As mentioned above, in some cases, a user equipment (UE) may be provided with beam failure detection (BFD) resources enabling the UE to perform BFD and candidate beam detection (CBD) operations. However, the introduction of a multiple transmission reception point (multi-TRP) operation (e.g., used to increase system capacity as well as reliability in the wireless communication system), may present certain challenges with regard to BFD and BFR procedures.

Aspects of the present disclosure provide techniques and apparatuses for per-TRP BFR in multi-TRP mode, which may enable separate BFD and separate CBD for beams corresponding to a TRP in a component carrier (CC) that is configured with two values of CORESET pool indices.

Potential enhancements to enable per-TRP based beam failure recovery may include TRP-specific BFD, TRP-specific new candidate beam identification, TRP-specific beam failure recovery request (BFRQ), base station (BS) (e.g., gNB) response enhancement, and UE behavior clarification on quasi co-location (QCL), spatial relation assumption, uplink (UL) power control for downlink (DL) and UL channels, and after receiving the response from the BS.

Aspects of the present disclosure provide enhancements to enable per beam group based (effectively per-TRP based) BFR, and more particularly, techniques for the configuration of physical uplink control channel (PUCCH) BFR for TRP (or beam group) specific BFR.

Because each TRP may have an associated beam group (a set of beams used to communicate with that TRP), a beam group may effectively identify a TRP. A UE may not actually know a TRP identifier (ID) but may, rather, know a beam group ID (and/or beams in a corresponding beam group).

Aspects of the present disclosure provide techniques that may help clarify configuration/operation rules for PUCCH transmissions for TRP (beam group) specific BFR scheduling requests (SRs) sent to request a UL grant for a medium access control (MAC) control element (CE) (MAC-CE) based BFRQ.

In a multi-TRP operation, after detecting a beam failure in one of the TRPs (or one of the beam groups associated with a TRP), a UE may transmit a BFR SR. As will be described in greater detail below, configuration of the PUCCH for SRs requesting UL grants to send TRP specific BFR MAC-CE may be in accordance with various rules described herein. In some cases, additional configuration of the SRs for TRP specific BFR, in accordance with rules proposed herein, may be specified in the 3GPP NR specification.

Figure 12:
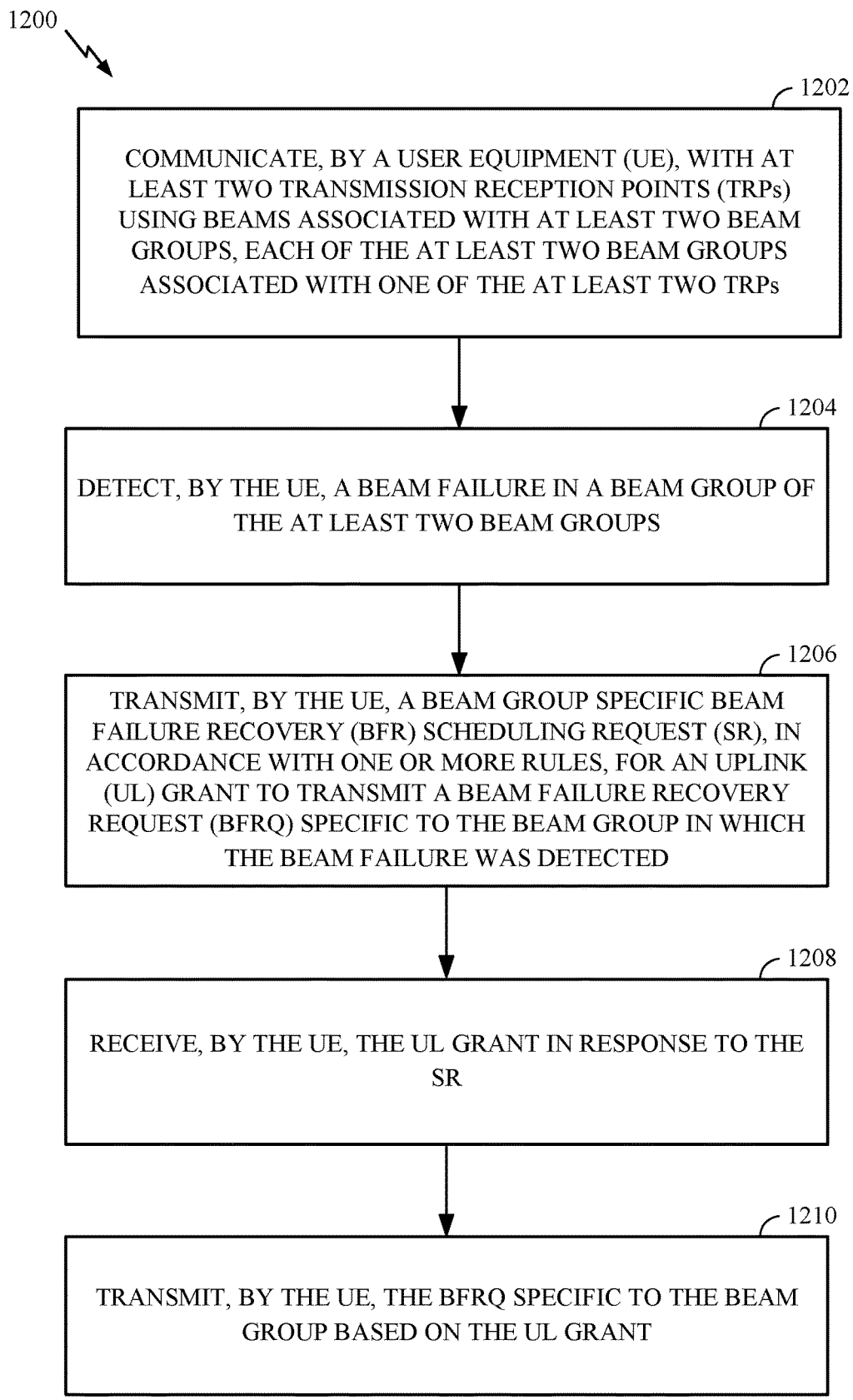
FIG. 12 is a flow diagram illustrating example operations for wireless communication by a UE, in accordance with certain aspects of the present disclosure.

FIG. 12 is a flow diagram illustrating example operations 1200 for wireless communication by a UE, in accordance with certain aspects of the present disclosure. Operations 1200 may be performed, for example, UE 120a in wireless communication network 100 of FIG. 1.

Operations 1200 may be implemented as software components that are executed and run on one or more processors (e.g., controller/processor 280 of FIG. 2). Further, the transmission and reception of signals by the UE in operations 1200 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 1200 begin, at block 1202, by the UE communicating with at least two TRPs using beams associated with at least two beam groups, each of the at least two beam groups associated with one of the at least two TRPs.

At block 1204, the UE detects a beam failure in a beam group of the at least two beam groups.

At block 1206, the UE transmits a beam group specific BFR SR, in accordance with one or more rules, for a UL grant to send a BFRQ specific to the beam group in which the beam failure was detected.

At block 1208, the UE receives the UL grant in response to the SR.

At block 1210, the UE transmits the BFRQ specific to the beam group based on the UL grant.

Figure 13:
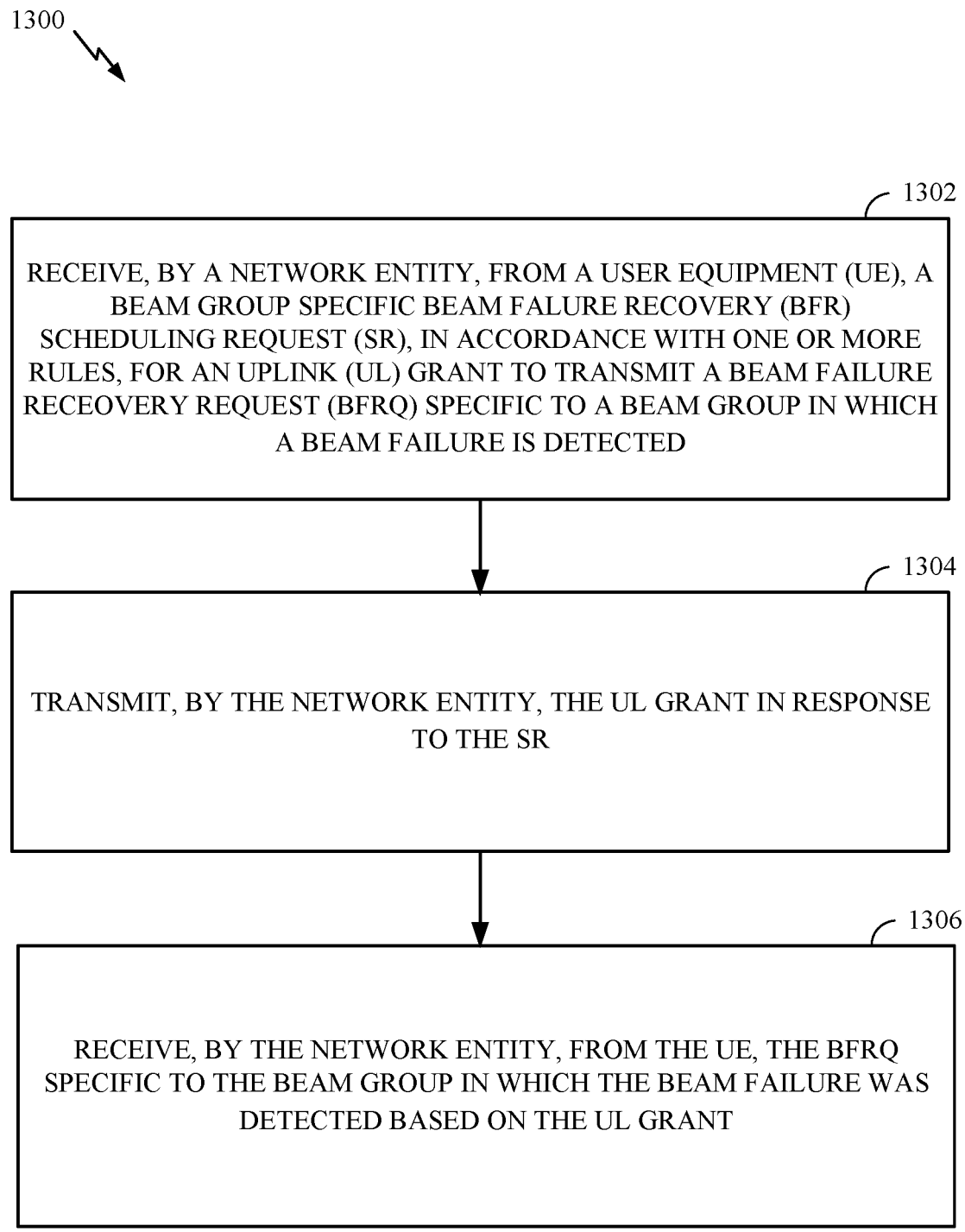
FIG. 13 is a flow diagram illustrating example operations for wireless communication by a network entity, in accordance with certain aspects of the present disclosure.

FIG. 13 is a flow diagram illustrating example operations 1300 for wireless communication by a network entity, in accordance with certain aspects of the present disclosure. Operations 1300 may be performed, for example, by a BS 110*a* in wireless communication network 100 of FIG. 1.

Operations 1300 may be implemented as software components that are executed and run on one or more processors (e.g., controller/processor 240 of FIG. 2). Further, the transmission and reception of signals by the network entity in operations 1300 may be enabled, for example, by one or more antennas (e.g., antennas 234 of FIG. 2). In certain aspects, the transmission and/or reception of signals by the network entity may be implemented via a bus interface of one or more processors (e.g., controller/processor 240) obtaining and/or outputting signals.

Operations 1300 begin, at block 1302, by the network entity receiving, from a UE, a beam group specific BFR SR, in accordance with one or more rules, for UL grant to send a BFRQ specific to a beam group in which a beam failure is detected.

At block 1304, the network entity transmits the UL grant in response to the SR.

At block 1306, the network entity receives, from the UE, the BFRQ specific to the beam group in which the beam failure was detected, based on the UL grant.

Various example rules described herein may address different considerations for TRP specific (or beam group specific) BFR.

For example, a first rule may address the coexistence of an SR for a secondary cell (Scell) BFR and an SR for a TRP specific (or beam group specific) BFR. More specifically, this rule may specify whether the SR for the TRP specific (or beam group specific) BFR (e.g., a first type of SR) and the SR for the SCell BFR (e.g., a second type of SR) may be configured simultaneously in a same cell group. In some cases, the rule may specify whether the PUCCH-SR for SCell BFR may be reused for TRP specific BFR.

In some examples, the SR for the SCell BFR and the SR for the TRP specific BFR may not be configured simultaneously within the same cell group. In some examples, the SR for the SCell BFR and the SR for the TRP specific BFR may be configured simultaneously within the same cell group. In other words, there may be up to two dedicated PUCCH-SR resources in a cell group, where the dedicated resources may be used for SCell BFR and TRP specific BFR.

In cases where the SRs may be configured simultaneously, in some examples, the rule may prohibit a PUCCH occasion for sending the SR for the SCell BFR and the PUCCH occasion for sending the SR for the TRP specific BFR to overlap in time. However, in some other examples where the SRs may be configured simultaneously, the rule may allow the PUCCH occasion for sending the SR for the SCell BFR and the PUCCH occasion for sending the SR for the TRP specific BFR to overlap in time.

A second rule may address PUCCH prioritization when a PUCCH resource of a triggered SR for TRP specific (or beam group specific) BFR overlaps with one or more other PUCCH resources of one or more other SR(s). More specifically, PUCCH prioritization may be based on whether the overlapped PUCCH resources include PUCCH resources for an SR for an SCell BFR.

In some examples, where the overlapped PUCCH resources do not include PUCCH resources for an SR for an SCell BFR, a medium access control (MAC) entity may consider only the PUCCH of the SR for the TRP specific BFR.

However, in some other examples, where the overlapped PUCCH resources do include PUCCH resources for an SR for an SCell BFR, the MAC entity has two options. In some examples, the MAC entity may consider only the PUCCH of the SR for the SCell BFR as valid. In some examples, the MAC entity may consider only the PUCCH of the SR for the TRP specific BFR as valid.

A third rule may specify how to multiplex an SR for a TRP specific (or beam group specific) BFR with at least one or more other SRs (e.g., of different types), or other uplink control information (UCI) (e.g., of different types). More specifically, rule three may address SR multiplexing when the SR for the TRP specific (or beam group specific) BFR is positive and has its corresponding PUCCH resource overlapped with both PUCCH resource(s) of prior SR(s) (e.g., K−1 SR(s), where K is an integer greater than zero) and a PUCCH resource of a hybrid automatic repeat request (HARQ) acknowledgement (ACK) or channel state information (CSI) report.

Multiplex specifications/rules may depend on whether the prior SR(s) (e.g., K−1 SR(s)) comprise an SR for an SCell BFR. In some examples, where the prior SR(s) (e.g., K−1 SR(s)) do not comprise an SR for an SCell BFR, the UE may transmit a number of UCI bits (e.g., ceil(log 2(K+1))) to indicate, in ascending order of the values of SR identifiers (IDs) of all overlapped SRs (e.g., K overlapped SRs), an order index of the SR ID for the TRP specific BFR.

In some examples, where the prior SR(s) (e.g., K−1 SR(s)) do comprise an SR for an SCell BFR, the UE may have two options. In a first option, the UE may transmit a number of UCI bits (e.g., ceil(log 2(K+1))) to indicate, in ascending order of the values of SR IDs of all overlapped SRs (e.g., K overlapped SRs), an order index of the SR ID for the TRP specific BFR. In a second option, the UE may transmit a number of UCI bits (e.g., ceil(log 2(K+1))) to indicate, in ascending order of the values of SR ID of all overlapped SRs (e.g., K overlapped SRs), an order index of the SR ID for the SCell BFR.

Accordingly, where an overlapped PUCCH resource is for HARQ ACK feedback in PUCCH format 2, 3, or 4, the number of UCI bits (e.g., ceil(log 2(K+1))) are appended to bits of the HARQ ACK feedback sent on that PUCCH resource.

Accordingly, where an overlapped PUCCH resource is for a CSI report in PUCCH format 2, 3, or 4, the number of UCI bits (e.g., ceil(log 2(K+1))) are prepended to bits of the CSI report sent on that PUCCH resource.

A fourth rule may address the termination condition of a triggered SR for TRP specific (or beam group specific) BFR. More specifically, rule four may specify when to cancel a pending SR, triggered prior to a MAC protocol data unit (PDU) assembly for TRP specific (or beam group specific) BFR of a serving cell, and when a respective timer (e.g., sr-ProhibitTimer) is to be stopped.

In some examples, a pending SR, triggered prior to the MAC PDU assembly for TRP specific (or beam group specific) BFR of a serving cell, shall be canceled/terminated when a MAC PDU, including a TRP specific BFR MAC-CE or truncated TRP specific BFR MAC-CE, is transmitted. The TRP specific BFR MAC-CE or truncated TRP specific BFR MAC-CE may include TRP specific BFR information of that serving cell.

In some examples, a pending SR, triggered prior to the MAC PDU assembly for TRP specific (or beam group specific) BFR of a serving cell, shall be canceled/terminated when the serving cell requiring the TRP specific BFR is deactivated (e.g., the serving cell is an SCell which requires deactivation after the SR is triggered).

A fifth rule may address whether performance of TRP specific (or beam group specific) BFD is proper when a bandwidth part (BWP) is activated and the active downlink (DL) BWP for the serving cell is a dormant BWP. The BWP that supports dormancy behavior for the SCell is referred to as dormant BWP, where PDCCH monitoring occasion is not configured.

In some examples, where the serving cell is configured with TRP specific BFR, the UE is to perform TRP specific (or beam group specific) BFD and BFR for the serving cell if a TRP specific beam failure is detected. In some other examples, where the serving cell is configured with TRP specific BFR, the UE is not to perform TRP specific (or beam group specific) BFD and BFR for the serving cell.

A sixth rule may address the proper PUCCH format of the SR for TRP specific (or beam group specific) BFR. In other words, the one or more rules may specify a PUCCH format to use for transmitting the beam group specific BFR SR. In some examples, the PUCCH resource associated with the SR for TRP specific (or beam group specific) BFR may be of PUCCH format 0.

In some examples, the PUCCH resource associated with the SR for TRP specific (or beam group specific) BFR may be of PUCCH format 1.

Additional configuration of the SRs for TRP specific BFR may be specified in the 3GPP NR specification.

In some cases, the various rules proposed herein may be combined in various manners. In some cases, which rules are applied and/or combined may be configured (e.g., by a network entity, such as a gNB).

Example Wireless Communication Devices

Figure 14:
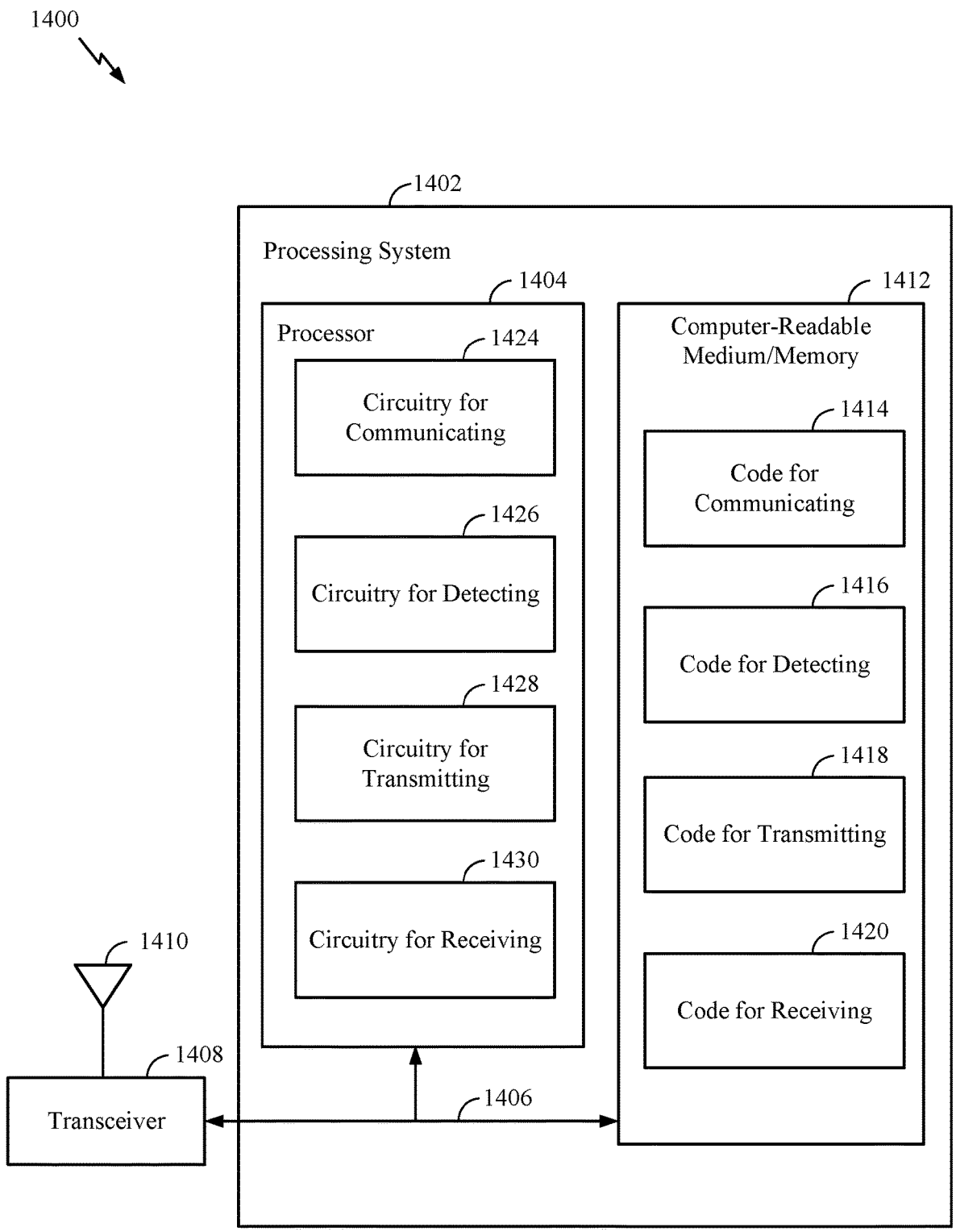
FIG. 14 illustrates a communications device that may include various components configured to perform operations for techniques disclosed herein, in accordance with certain aspects of the present disclosure.

FIG. 14 illustrates a communications device 1400 that may include various components (e.g., corresponding to means-plus-function components) operable, configured, or adapted, to perform operations for the techniques disclosed herein, such as operations 1200 illustrated in FIG. 12. In some examples, communications device 1400 may be a user equipment (UE), such as UE 120a described with respect to FIGS. 1 and 2.

Communications device 1400 includes a processing system 1402 coupled to a transceiver 1408 (e.g., a transmitter and/or a receiver). Transceiver 1408 is configured to transmit and receive signals for communications device 1400 via an antenna 1410, such as the various signals as described herein. Processing system 1402 may be configured to perform processing functions for communications device 1400, including processing signals received and/or to be transmitted by communications device 1400.

Processing system 1402 includes a processor 1404 coupled to a computer-readable medium/memory 1412 via a bus 1406. In certain aspects, computer-readable medium/memory 1412 is configured to store instructions (e.g., computer-executable code) that when executed by processor 1404, cause processor 1404 to perform operations 1200 illustrated in FIG. 12, or other operations for performing the various techniques discussed herein for the configuration of physical uplink control channel (PUCCH) beam failure recovery (BFR) for transmission reception point (TRP) specific beam failure recovery (BFR).

In certain aspects, computer-readable medium/memory 1412 stores code 1414 (an example means for) for communicating; code 1416 (an example means for) for detecting; code 1418 (an example means for) for transmitting; and code 1420 (an example means for) for receiving.

In certain aspects, code 1414 for communicating may include code for communicating with at least two transmission reception points (TRPs) using beams associated with at least two beam groups, each of the at least two beams groups associated with one of the at least two TRPs.

In certain aspects, code 1416 for detecting may include code for detecting a beam failure in a beam group of the at least two beam groups.

In certain aspects, code 1418 for transmitting may include code for transmitting a beam group specific beam failure recovery (BFR) scheduling request (SR), in accordance with one or more rules, for an uplink (UL) grant to transmit a beam failure recovery request (BFRQ) specific to the beam group in which the beam failure was detected. In certain aspects, code 1418 for transmitting may include code for transmitting the BFRQ specific to the beam group based on the UL grant.

In certain aspects, code 1420 for receiving may include code for receiving the UL grant in response to the SR.

In certain aspects, processor 1404 has circuitry configured to implement the code stored in computer-readable medium/ memory 1412. Processor 1404 includes circuitry 1424 (an example means for) for communicating; circuitry 1426 (an example means for) for detecting; circuitry 1428 (an example means for) for transmitting; and circuitry 1430 (an example means for) for receiving.

In certain aspects, circuitry 1424 for communicating may include circuitry for communicating with at least two TRPs using beams associated with at least two beam groups, each of the at least two beams groups associated with one of the at least two TRPs.

In certain aspects, circuitry 1426 for detecting may include circuitry for detecting a beam failure in a beam group of the at least two beam groups.

In certain aspects, circuitry 1428 for transmitting may include circuitry for transmitting a BFR SR, in accordance with one or more rules, for a UL grant to transmit a BFRQ specific to the beam group in which the beam failure was detected. In certain aspects, circuitry 1428 for transmitting may include circuitry for transmitting the BFRQ specific to the beam group based on the UL grant.

In certain aspects, circuitry 1430 for receiving may include circuitry for receiving the UL grant in response to the SR.

Various components of communications device 1400 may provide means for performing the methods described herein, including with respect to FIG. 12.

In some examples, means for communicating and means for detecting, includes a processing system, which may include one or more processors, such as the receive processor 258, transmit processor 264, TX MIMO processor 266, and/or controller/processor 280 of UE 120a illustrated in FIG. 2 and/or processing system 1402 of communications device 1400 in FIG. 14.

In some examples, means for transmitting or sending (or means for outputting for transmission) may include transceivers 254 and/or antenna(s) 252 of UE 120a illustrated in FIG. 2 and/or transceiver 1408 and antenna 1410 of communications device 1400 in FIG. 14.

In some examples, means for receiving (or means for obtaining) may include transceivers 254 and/or antenna(s) 252 of UE 120a illustrated in FIG. 2 and/or transceiver 1408 and antenna 1410 of communications device 1400 in FIG. 14.

In some examples, means for transmitting and means for receiving may include various processing system components, such as: one or more processors 1404 in FIG. 14 or aspects of UE 120a depicted in FIG. 2, including receive processor 258, transmit processor 264, TX MIMO processor 266, and/or controller/processor 280 (including beam manager 122).

Notably, FIG. 14 is just use one example, and many other examples and configurations of communications device 1400 are possible.

Figure 15:
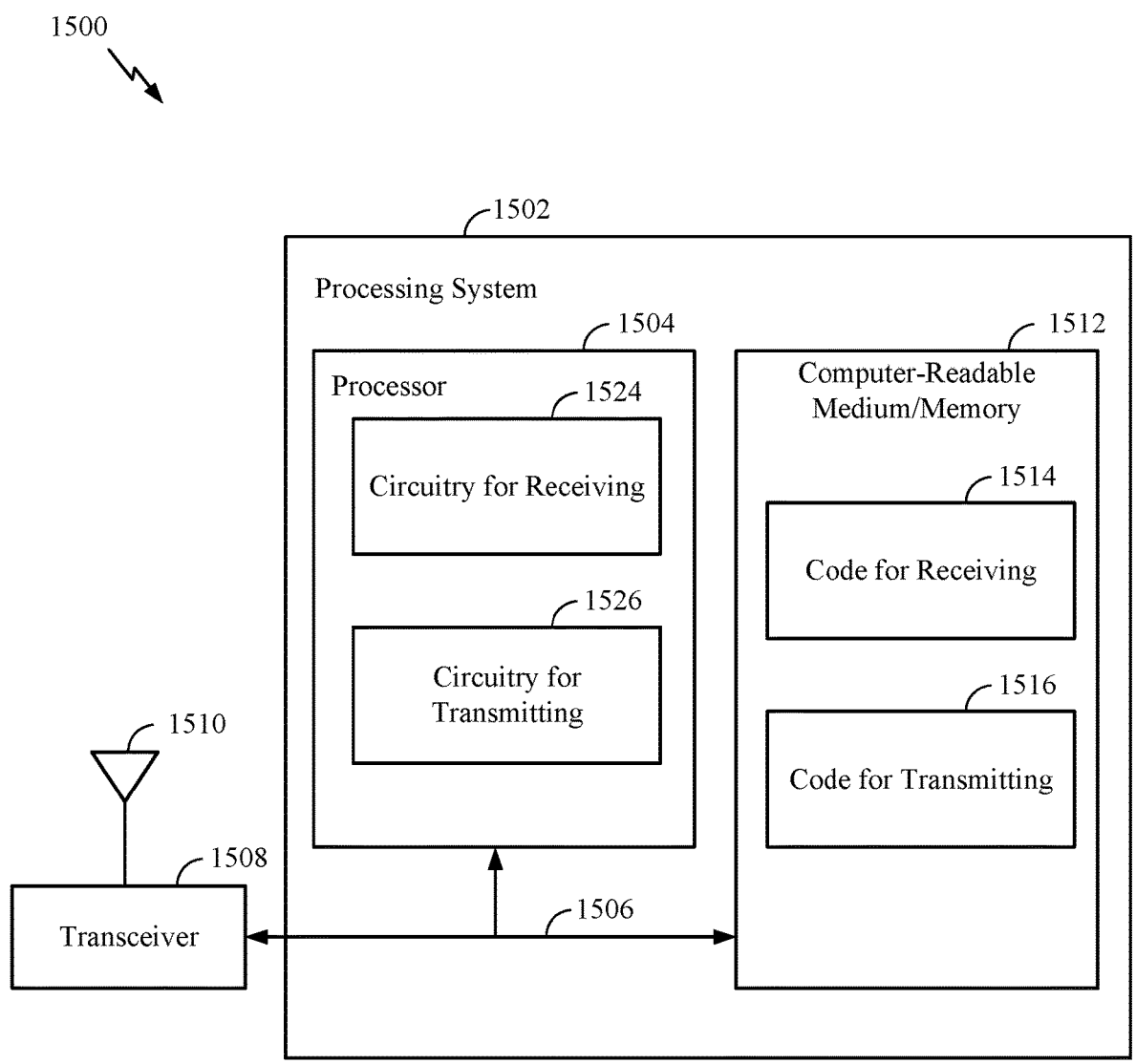
FIG. 15 illustrates a communications device that may include various components configured to perform operations for techniques disclosed herein, in accordance with certain aspects of the present disclosure.

FIG. 15 illustrates a communications device 1500 that may include various components (e.g., corresponding to means-plus-function components) operable, configured, or adapted to perform operations for the techniques disclosed herein, such as operations 1300 illustrated in FIG. 13. In some examples, communications device 1500 may be a network entity, such as base station (BS) 110a described with respect to FIGS. 1 and 2.

Communications device 1500 includes a processing system 1502 coupled to a transceiver 1508 (e.g., a transmitter and/or a receiver). Transceiver 1508 is configured to transmit and receive signals for communications device 1500 via an antenna 1510, such as the various signals as described herein. Processing system 1502 may be configured to perform processing functions for communications device 1500, including processing signals received and/or to be transmitted by communications device 1500.

Processing system 1502 includes a processor 1504 coupled to a computer-readable medium/memory 1512 via a bus 1506. In certain aspects, computer-readable medium/memory 1512 is configured to store instructions (e.g., computer-executable code) that when executed by processor 1504, cause processor 1504 to perform operations 1300 illustrated in FIG. 13, or other operations for performing the various techniques discussed herein for the configuration of PUCCH BFR for TRP specific BFR.

In certain aspects, computer-readable medium/memory 1512 stores code 1514 (an example means for) for receiving; and code 1516 (an example means for) for transmitting.

In certain aspects, code 1514 for receiving may include code for receiving, from a UE, a beam group specific BFR SR, in accordance with one or more rules, for a UL grant to transmit a BFRQ specific to a beam group in which a beam failure is detected. In certain aspects, code 1514 for receiving may include code for receiving, from the UE, the BFRQ specific to the beam group in which the beam failure was detected, based on the UL grant.

In certain aspects, code 1516 for transmitting may include code for transmitting the UL grant in response to the SR.

In certain aspects, processor 1504 has circuitry configured to implement the code stored in computer-readable medium/memory 1512. Processor 1504 includes circuitry 1524 (an example means for) for receiving; and circuitry 1526 (an example means for) for transmitting.

In certain aspects, circuitry 1524 for receiving may include circuitry for receiving, from a UE, a beam group specific BFR SR, in accordance with one or more rules, for a UL grant to transmit a BFRQ specific to a beam group in which a beam failure is detected. In certain aspects, circuitry 1524 for receiving may include circuitry for receiving, from the UE, the BFRQ specific to the beam group in which the beam failure was detected, based on the UL grant.

In certain aspects, circuitry 1526 for transmitting may include circuitry for transmitting the UL grant in response to the SR.

Various components of communications device 1500 may provide means for performing the methods described herein, including with respect to FIG. 13.

In some examples, means for transmitting or sending (or means for outputting for transmission) may include transceivers 232 and/or antenna(s) 234 of BS 110a illustrated in FIG. 2 and/or transceiver 1508 and antenna 1510 of communications device 1500 in FIG. 15.

In some examples, means for receiving (or means for obtaining) may include transceivers 232 and/or antenna(s) 234 of BS 110a illustrated in FIG. 2 and/or transceiver 1508 and antenna 1510 of communications device 1500 in FIG. 15.

In some examples, means for transmitting and means for receiving may include various processing system components, such as: one or more processors 1504 in FIG. 15 or aspects of BS 110a depicted in FIG. 2, including receive processor 238, transmit processor 220, TX MIMO processor 230, and/or controller/processor 240 (including beam manager 112).

Notably, FIG. 15 is just use one example, and many other examples and configurations of communications device 1500 are possible.

Example Clauses

Implementation examples are described in the following numbered clauses:

Clause 1: A method of wireless communication by a user equipment (UE), comprising: communicating with at least two transmission reception points (TRPs) using beams associated with at least two beam groups, each of the at least two beams groups associated with one of the at least two TRPs; detecting a beam failure in a beam group of the at least two beam groups; transmitting a beam group specific beam failure recovery (BFR) scheduling request (SR), in accordance with one or more rules, for an uplink (UL) grant to transmit a beam failure recovery request (BFRQ) specific to the beam group in which the beam failure was detected; receiving the UL grant in response to the SR; and transmitting the BFRQ specific to the beam group based on the UL grant.

Clause 2: The method of Clause 1, wherein the one or more rules specify whether the SR for the beam group specific BFR and another SR for a secondary cell (SCell) BFR can be configured simultaneously in a same cell group.

Clause 3: The method of Clause 2, wherein the one or more rules prohibit the SR for the beam group specific BFR and the other SR for the SCell BFR to be configured simultaneously in the same cell group.

Clause 4: The method of Clause 2 or 3, wherein the one or more rules: allow the SR for the beam group specific BFR and the other SR for the SCell BFR to be configured simultaneously in the same cell group; and allow physical uplink control channel (PUCCH) occasions for transmitting the SR for the beam group specific BFR and the other SR for the SCell BFR to overlap in time.

Clause 5: The method of any of Clauses 2-4, wherein the one or more rules: allow the SR for the beam group specific BFR and the other SR for the SCell BFR to be configured simultaneously in the same cell group; and prohibit physical uplink control channel (PUCCH) occasions for transmitting the SR for the beam group specific BFR and the other SR for the SCell BFR to overlap in time.

Clause 6: The method of any of Clauses 1-5, wherein the one or more rules prioritize the SR for the beam group specific BFR over one or more other SRs when physical uplink control channel (PUCCH) resources for the SR for the beam group specific BFR and the one or more other SRs overlap, wherein the one or more other SRs do not comprise beam group specific BFR SRs.

Clause 7: The method of Clause 6, wherein, where the PUCCH resources for the SR for the beam group specific BFR overlapped with PUCCH resources for the one or more other SRs do not include PUCCH resources for an SR for a secondary cell (SCell) BFR, a medium access control (MAC) entity only considers a PUCCH of the SR for the beam group specific BFR valid.

Clause 8: The method of Clause 6 or 7, wherein, where the PUCCH resources for the SR for the beam group specific BFR overlapped with PUCCH resources for the one or more other SRs do include PUCCH resources for an SR for a secondary cell (SCell) BFR, a medium access control (MAC) entity considers only one of a PUCCH of the SR for the beam group specific BFR or a PUCCH of the SR for the SCell BFR as valid, as specified by the one or more rules.

Clause 9: The method of any of Clauses 1-8, wherein the one or more rules specify how to multiplex the SR for the beam group specific BFR with at least one of one or more other SRs or uplink control information (UCI), wherein the one or more other SRs do not comprise beam group specific BFR SRs.

Clause 10: The method of Clause 9, wherein, where the one or more other SRs comprise an SR for a secondary cell (SCell) BFR, the one or more rules specify a number of UCI bits to use to indicate, in ascending order, an order index of an SR identifier (ID) for the SR for the beam group specific BFR and the one or more other SRs.

Clause 11: The method of Clause 9 or 10, wherein, where the one or more other SRs do not comprise an SR for a secondary cell (SCell) BFR, the one or more rules specify either: a number of UCI bits to use to indicate, in ascending order, an order index of an SR identifier (ID) for the SR for the beam group specific BFR and the one or more other SRs; or a number of UCI bits to use to indicate, in ascending order, the order index of the SR ID for the SR for the SCell BFR and SR IDs for other overlapped SRs.

Clause 12: The method of any of Clauses 9-11, wherein at least one of: where an overlapped PUCCH resource is for hybrid automatic repeat request (HARQ) acknowledgment (ACK) feedback, UCI bits for SRs are appended to bits of the HARQ ACK feedback sent on that PUCCH resource; or where an overlapped PUCCH resource is for a channel state information (CSI) report, UCI bits for SRs are prepended to bits of the CSI report sent on that PUCCH resource.

Clause 13: The method of any of Clauses 1-12, wherein the one or more rules specify when to cancel the SR for the beam group specific BFR of a serving cell upon a termination condition.

Clause 14: The method of Clause 13, wherein the one or more rules specify that the SR for the beam group specific BFR is canceled when at least one of: a medium access control (MAC) protocol data unit (PDU) is transmitted that includes a beam group specific BFR MAC control element (CE) (MAC-CE) or a truncated beam group specific BFR MAC CE which contains beam group specific BFR information of the serving cell; or the serving cell is deactivated.

Clause 15: The method of any of Clauses 1-14, wherein the one or more rules specify whether the UE is to perform beam group specific beam failure detection (BFD) when a bandwidth part (BWP) is activated and an active downlink (DL) BWP for a serving cell is dormant.

Clause 16: The method of Clause 15, wherein the one or more rules specify either: that the UE is to perform the beam group specific BFD and BFR for the serving cell when a beam group specific beam failure is detected; or that the UE is not to perform the beam group specific BFD and BFR for the serving cell.

Clause 17: The method of any of Clauses 1-16, wherein the one or more rules specify a physical uplink control channel (PUCCH) format to use for transmitting the beam group specific BFR SR.

Clause 18: A method of wireless communication by a network entity, comprising: receiving, from a user equipment (UE), a beam group specific beam failure recovery (BFR) scheduling request (SR), in accordance with one or more rules, for an uplink (UL) grant to transmit a beam failure recovery request (BFRQ) specific to a beam group in which a beam failure is detected; transmitting the UL grant in response to the SR; and receiving, from the UE, the BFRQ specific to the beam group in which the beam failure was detected, based on the UL grant.

Clause 19: The method of Clause 18, wherein the one or more rules specify whether the SR for the beam group specific BFR and another SR for a secondary cell (SCell) BFR can be configured simultaneously in a same cell group.

Clause 20: The method of Clause 19, wherein the one or more rules prohibit the SR for the beam group specific BFR and the other SR for the SCell BFR to be configured simultaneously in the same cell group.

Clause 21: The method of Clause 19 or 20, wherein the one or more rules: allow the SR for the beam group specific BFR and the other SR for the SCell BFR to be configured simultaneously in the same cell group; and allow physical uplink control channel (PUCCH) occasions for receiving the SR for the beam group specific BFR and the other SR for the SCell BFR to overlap in time.

Clause 22: The method of any of Clauses 19-21, wherein the one or more rules: allow SR for the beam group specific BFR and the other SR for the SCell BFR to be configured simultaneously in the same cell group; and prohibit physical uplink control channel (PUCCH) occasions for receiving SR for the beam group specific BFR and the other SR for the SCell BFR to overlap in time.

Clause 23: The method of any of Clauses 19-22, wherein the one or more rules prioritize the SR for the beam group specific BFR over one or more other SRs when physical uplink control channel (PUCCH) resources for the SR for the beam group specific BFR and the one or more other SRs overlap, wherein the one or more other SRs do not comprise beam group specific BFR SRs.

Clause 24: The method of Clause 23, wherein, where the PUCCH resources for the SR for the beam group specific BFR overlapped with PUCCH resources for the one or more other SRs do not include PUCCH resources for an SR for a secondary cell (SCell) BFR, a medium access control (MAC) entity only considers a PUCCH of the SR for the beam group specific BFR valid.

Clause 25: The method of Clause 23 or 24, wherein, where the PUCCH resources for the SR for the beam group specific BFR overlapped with PUCCH resources for the one or more other SRs do include PUCCH resources for an SR for a secondary cell (SCell) BFR, a MAC entity considers only one of a PUCCH of the SR for the beam group specific BFR or a PUCCH of the SR for the SCell BFR as valid, as specified by the one or more rules.

Clause 26: The method of any of Clauses 18-25, wherein the one or more rules specify how to multiplex the SR for the beam group specific BFR with at least one of one or more other SRs or uplink control information (UCI), wherein the one or more other SRs do not comprise beam group specific BFR SRs.

Clause 27: The method of Clause 26, wherein, where the one or more other SRs comprise an SR for a secondary cell (SCell) BFR, the one or more rules specify a number of UCI bits to use to indicate, in ascending order, an order index of an SR identifier (ID) for the SR for the beam group specific BFR and the one or more other SRs.

Clause 28: The method of any of Clauses 18-27, wherein the one or more rules specify when to cancel the SR for the beam group specific BFR of a serving cell upon a termination condition.

Clause 29: An apparatus, comprising: a memory; and one or more processors coupled to the memory, the memory and the one or more processors being configured to perform a method in accordance with any one of Clauses 1-28.

Clause 30: An apparatus, comprising means for performing a method in accordance with any one of Clauses 1-28.

Clause 31: A non-transitory computer-readable medium comprising executable instructions that, when executed by one or more processors of an apparatus, cause the apparatus to perform a method in accordance with any one of Clauses 1-28.

Clause 32: A computer program product embodied on a computer-readable storage medium comprising code for performing a method in accordance with any one of Clauses 1-28.

Additional Considerations

In 3GPP, the term "cell" can refer to a coverage area of a Node B (NB) and/or a NB subsystem serving this coverage area, depending on the context in which the term is used. In NR systems, the term "cell" and B S, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. ABS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 12 and/or FIG. 13.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communication by a user equipment (UE), comprising:
    communicating with at least two transmission reception points (TRPs) using beams associated with at least two beam groups, each of the at least two beams groups associated with one of the at least two TRPs;
    detecting a beam failure in a beam group of the at least two beam groups;
    transmitting a beam group specific beam failure recovery (BFR) scheduling request (SR), in accordance with one or more combinable rules for an uplink (UL) grant to transmit a beam failure recovery request (BFRQ) specific to the beam group in which the beam failure was detected;
    receiving the UL grant in response to the SR; and
    transmitting the BFRQ specific to the beam group based on the UL grant.

2. The method of claim 1, wherein the one or more rules specify whether the SR for the beam group specific BFR and another SR for a secondary cell (SCell) BFR can be configured simultaneously in a same cell group.

3. The method of claim 2, wherein the one or more rules prohibit the SR for the beam group specific BFR and the other SR for the SCell BFR to be configured simultaneously in the same cell group.

4. The method of claim 2, wherein the one or more rules:
    allow the SR for the beam group specific BFR and the other SR for the SCell BFR to be configured simultaneously in the same cell group; and
    allow physical uplink control channel (PUCCH) occasions for transmitting the SR for the beam group specific BFR and the other SR for the SCell BFR to overlap in time.

5. The method of claim 2, wherein the one or more rules:
    allow the SR for the beam group specific BFR and the other SR for the SCell BFR to be configured simultaneously in the same cell group; and
    prohibit physical uplink control channel (PUCCH) occasions for transmitting the SR for the beam group specific BFR and the other SR for the SCell BFR to overlap in time.

6. The method of claim 1, wherein the one or more rules prioritize the SR for the beam group specific BFR over one or more other SRs when physical uplink control channel (PUCCH) resources for the SR for the beam group specific BFR and the one or more other SRs overlap, wherein the one or more other SRs do not comprise beam group specific BFR SRs.

7. The method of claim 6, wherein, where the overlapped PUCCH resources do not include PUCCH resources for an SR for a secondary cell (SCell) BFR, a medium access control (MAC) entity only considers a PUCCH of the SR for the beam group specific BFR valid.

8. The method of claim 6, wherein, where the overlapped PUCCH resources do include PUCCH resources for an SR for a secondary cell (SCell) BFR, a medium access control (MAC) entity considers only one of a PUCCH of the SR for the beam group specific BFR or a PUCCH of the SR for the SCell BFR as valid, as specified by the one or more rules.

9. The method of claim 1, wherein the one or more rules specify how to multiplex the SR for the beam group specific BFR with at least one of one or more other SRs or uplink control information (UCI), wherein the one or more other SRs do not comprise beam group specific BFR SRs.

10. The method of claim 9, wherein, where the one or more other SRs comprise an SR for a secondary cell (SCell) BFR, the one or more rules specify a number of UCI bits to use to indicate, in ascending order, an order index of an SR identifier (ID) for the SR for the beam group specific BFR and the one or more other SRs.

11. The method of claim 9, wherein, where the one or more other SRs do not comprise an SR for a secondary cell (SCell) BFR, the one or more rules specify either:
    a number of UCI bits to use to indicate, in ascending order, an order index of an SR identifier (ID) for the SR for the beam group specific BFR and the one or more other SRs; or
    a number of UCI bits to use to indicate, in ascending order, the order index of the SR ID for the SR for the SCell BFR and SR IDs for other overlapped SRs.

12. The method of claim 9, wherein at least one of:
    where an overlapped PUCCH resource is for hybrid automatic repeat request (HARQ) acknowledgment (ACK) feedback, UCI bits for SRs are appended to bits of the HARQ ACK feedback sent on that PUCCH resource; or
    where an overlapped PUCCH resource is for a channel state information (CSI) report, UCI bits for SRs are prepended to bits of the CSI report sent on that PUCCH resource.

13. The method of claim 1, wherein the one or more rules specify when to cancel the SR for the beam group specific BFR of a serving cell upon a termination condition.

14. The method of claim 13, wherein the one or more rules specify that the SR for the beam group specific BFR is canceled when at least one of:
    a medium access control (MAC) protocol data unit (PDU) is transmitted that includes a beam group specific BFR MAC control element (CE) (MAC-CE) or a truncated beam group specific BFR MAC CE which contains beam group specific BFR information of the serving cell; or the serving cell is deactivated.

15. The method of claim 1, wherein the one or more rules specify whether the UE is to perform beam group specific beam failure detection (BFD) when a bandwidth part (BWP) is activated and an active downlink (DL) BWP for a serving cell is dormant.

16. The method of claim 15, wherein the one or more rules specify either:

that the UE is to perform the beam group specific BFD and BFR for the serving cell when a beam group specific beam failure is detected; or that the UE is not to perform the beam group specific BFD and BFR for the serving cell.

17. The method of claim 1, wherein the one or more rules specify a physical uplink control channel (PUCCH) format to use for transmitting the beam group specific BFR SR.

18. A method of wireless communication by a network entity, comprising:

receiving, from a user equipment (UE), a beam group specific beam failure recovery (BFR) scheduling request (SR), in accordance with one or more combinable rules, for an uplink (UL) grant to transmit a beam failure recovery request (BFRQ) specific to a beam group in which a beam failure is detected;

transmitting the UL grant in response to the SR; and receiving, from the UE, the BFRQ specific to the beam group in which the beam failure was detected, based on the UL grant.

19. The method of claim 18, wherein the one or more rules specify whether the SR for the beam group specific BFR and another SR for a secondary cell (SCell) BFR can be configured simultaneously in a same cell group.

20. The method of claim 19, wherein the one or more rules prohibit the SR for the beam group specific BFR and the other SR for the SCell BFR to be configured simultaneously in the same cell group.

21. The method of claim 19, wherein the one or more rules:

allow the SR for the beam group specific BFR and the other SR for the SCell BFR to be configured simultaneously in the same cell group; and allow physical uplink control channel (PUCCH) occasions for receiving the SR for the beam group specific BFR and the other SR for the SCell BFR to overlap in time.

22. The method of claim 19, wherein the one or more rules:

allow SR for the beam group specific BFR and the other SR for the SCell BFR to be configured simultaneously in the same cell group; and prohibit physical uplink control channel (PUCCH) occasions for receiving SR for the beam group specific BFR and the other SR for the SCell BFR to overlap in time.

23. The method of claim 19, wherein the one or more rules prioritize the SR for the beam group specific BFR over one or more other SRs when physical uplink control channel (PUCCH) resources for the SR for the beam group specific BFR and the one or more other SRs overlap, wherein the one or more other SRs do not comprise beam group specific BFR SRs.

24. The method of claim 23, wherein, where the overlapped PUCCH resources do not include PUCCH resources for an SR for a secondary cell (SCell) BFR, a medium access control (MAC) entity only considers a PUCCH of the SR for the beam group specific BFR valid.

25. The method of claim 23, wherein, where the overlapped PUCCH resources do include PUCCH resources for an SR for a secondary cell (SCell) BFR, a MAC entity considers only one of a PUCCH of the SR for the beam group specific BFR or a PUCCH of the SR for the SCell BFR as valid, as specified by the one or more rules.

26. The method of claim 18, wherein the one or more rules specify how to multiplex the SR for the beam group specific BFR with at least one of one or more other SRs or uplink control information (UCI), wherein the one or more other SRs do not comprise beam group specific BFR SRs.

27. The method of claim 26, wherein, where the one or more other SRs comprise an SR for a secondary cell (SCell) BFR, the one or more rules specify a number of UCI bits to use to indicate, in ascending order, an order index of an SR identifier (ID) for the SR for the beam group specific BFR and the one or more other SRs.

28. The method of claim 18, wherein the one or more rules specify when to cancel the SR for the beam group specific BFR of a serving cell upon a termination condition.

29. An apparatus for wireless communication, comprising:

a memory; and one or more processors coupled to the memory, the one or more processors being configured to:

communicate with at least two transmission reception points (TRPs) using beams associated with at least two beam groups, each of the at least two beams groups associated with one of the at least two TRPs;

detect a beam failure in a beam group of the at least two beam groups;

transmit a beam group specific beam failure recovery (BFR) scheduling request (SR), in accordance with one or more combinable rules, for an uplink (UL) grant to transmit a beam failure recovery request (BFRQ) specific to the beam group in which the beam failure was detected;

receive the UL grant in response to the SR; and transmit the BFRQ specific to the beam group based on the UL grant.

30. An apparatus for wireless communication, comprising:

a memory; and one or more processors coupled to the memory, the one or more processors being configured to:

receive, from a user equipment (UE), a beam group specific beam failure recovery (BFR) scheduling request (SR), in accordance with one or more combinable rules, for an uplink (UL) grant to transmit a beam failure recovery request (BFRQ) specific to a beam group in which the a beam failure is detected;

transmit the UL grant in response to the SR; and receive, from the UE, the BFRQ specific to the beam group in which the beam failure was detected, based on the UL grant.

* * * * *